United States Patent
Ono et al.

(10) Patent No.: US 7,209,634 B2
(45) Date of Patent: Apr. 24, 2007

(54) DATA PROCESSING METHOD, DATA PROCESSING APPARATUS, AND PROGRAM RECORDING MEDIUM

(75) Inventors: Tadashi Ono, Kyotanabe (JP); Tatsuro Juri, Osaka (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 355 days.

(21) Appl. No.: 10/871,281

(22) Filed: Jun. 21, 2004

(65) Prior Publication Data

US 2004/0228612 A1     Nov. 18, 2004

Related U.S. Application Data

(62) Division of application No. 09/554,751, filed as application No. PCT/JP99/05247 on Sep. 27, 1999, now Pat. No. 6,771,877.

(51) Int. Cl.
*H04N 7/00* (2006.01)
*H04N 7/26* (2006.01)

(52) U.S. Cl. ............... 386/46; 386/109; 386/124

(58) Field of Classification Search .......... 386/46, 386/109, 111, 112, 124, 1
See application file for complete search history.

(56) References Cited

U.S. PATENT DOCUMENTS

| | | |
|---|---|---|
| 5,526,200 A | 6/1996 | Yada |
| 5,784,527 A | 7/1998 | Ort et al. |
| 6,532,334 B1 | 3/2003 | Kikuchi et al. |
| 2001/0020979 A1 | 9/2001 | Lathrop |
| 2003/0142956 A1 | 7/2003 | Tomita et al. |

FOREIGN PATENT DOCUMENTS

| | | |
|---|---|---|
| CN | 1232264 | 10/1999 |
| EP | 0 690 621 | 1/1996 |
| JP | 5-167991 | 7/1993 |
| JP | 8-212694 | 8/1996 |
| JP | 9-130756 | 5/1997 |
| JP | 09320172 | 12/1997 |
| JP | 10-164468 | 6/1998 |
| WO | WO 97/13371 | 4/1997 |

OTHER PUBLICATIONS

Chinese Office Action (dated Dec. 26, 2003) with English-language translation.
International Search Report PCT/JP9905247 dated Sep. 14, 2006.

*Primary Examiner*—Robert Chevalier
(74) *Attorney, Agent, or Firm*—Smith, Gambrills & Russell

(57) ABSTRACT

When inputting moving image data into a personal computer for display or for recording on a recording medium, there often occur cases where processing cannot catch up with the input, resulting in interruption of the processing. Also, when performing conversion from an input digital signal having an arbitrary number of samples to an output digital signal having an arbitrary number of samples, prior art methods entail the possibility that the memory capacity and the amount of computation may become enormous. In view of this, according to the present invention, if the image processing cannot catch up with the input, the data is re-input for processing by utilizing information concerning the recorded position, the recorded time, or the time at which playback is to be performed; this achieves the same effect as processing continuous moving image data without interruption.

12 Claims, 18 Drawing Sheets

DATA PROCESSING METHOD, DATA PROCESSING APPARATUS, AND PROGRAM RECORDING MEDIUM

CROSS REFERENCE TO RELATED APPLICATION

This application is a division of application Ser. No. 09/554,751, filed May 19, 2000 now U.S. Pat. No. 6,771,877 which is a 35 U.S.C. § 371 national stage filing of PCT/JP99/05247 filed 27 Sep. 1999 and each is incorporated in their entirety by reference.

TECHNICAL FIELD

The present invention relates to a method and apparatus for taking, for example, moving image data as an input for playback on a TV monitor or for recording on a recording medium, and further relates to a method and apparatus for performing frequency conversion on image data, audio data, etc.

BACKGROUND ART

With increasing performance of personal computers, there has arisen a need to handle moving images such as TV signals on personal computers. When handling moving images on a personal computer, an apparatus such as a digital VTR for inputting moving images to the personal computer is connected, and moving image data prerecorded on a video tape or the like is input to the personal computer via the apparatus. The input moving image data is processed in various ways such as display on the screen of the personal computer and recording on a hard disk.

On the other hand, when playing back moving image data with audio on a personal computer, sample data conversion for converting the frequency of video and audio of digital format may become necessary because of the constraints of the hardware constituting the personal computer and other software.

In the prior art, when performing sample rate conversion, it is common practice to first upsample the input digital data and then apply low-pass filtering to decimate the data according to the output sample rate.

A sample data conversion method according to the prior art will be described below with reference to FIG. 17.

FIG. 17 is a diagram for explaining one example of sample data conversion according to the prior art.

The example of FIG. 17 shows sample data sequence conversion in the case where an input sample data sequence X[i] consisting of 400 samples is converted into an output sample data sequence Y[j] consisting of 300 samples. In this example, data X[i] represents, for example, the actual pixel value of the input image before the conversion, while Y[j] represents the pixel value of the output image after the conversion. In this case, i and j are variables each corresponding to the position coordinates of a pixel in the horizontal direction on a line in a frame.

First, a data sequence Z[k] upsampled from the input sample data sequence X[i] is obtained. When performing the upsampling, interpolation must be applied to the input sample data sequence X[i] so that all sample values Y[j] in the output sample data sequence Y[j] after the conversion will be contained in the data sequence Z[k]. Accordingly, the number of samples in the upsampled data sequence Z[k] is the least common multiple of the number of samples in the input sample data sequence X[i] and the number of samples in the output sample data sequence Y[j]. That is, it is the least common multiple of the number of samples before the conversion and the number of samples after the conversion. In the illustrated example, the number of samples in the upsampled data sequence Z[k] is 1,200 which is the least common multiple of 400 and 300.

Then, after low-pass filtering the upsampled data sequence Z[k] to eliminate distortion due to aliasing, unnecessary samples are decimated to obtain the output sample data sequence Y[j]. In the example of FIG. 17, the output sample data sequence Y[j] can be obtained by selecting, for example, a first sample in the upsampled data sequence Z[k], and then selecting every fourth sample from the first sample.

The above-described method is disclosed, for example, in Japanese Laid-open Patent No. 10-164468.

In the above method, when obtaining each sample in the upsampled data sequence Z[k], there frequently occur calculations for obtaining the value of a sample between two adjacent samples X[i] and X[i+1] in the input sample data sequence X[i] by weighted averaging based on the ratio between the distance from X[i] and the distance from X[i+1], i.e., $(1-w):w$ $(0 \leq w \leq 1)$. When obtaining a number AX existing at a designated position between two numbers A1 and A2 by using the ratio of the distances from A1 and A2 as described above, if the following (equation 12) holds, the value of the number AX is expressed by (equation 13) shown below.

(Distance between numbers $A1$ and $AX$):(Distance between numbers $AX$ and $A2$)=$(1-w):w$ (Equation 12)

where $0 \leq w \leq 1$ $AX = w \times A1 + (1-w) \times A2$ (Equation 13)

When obtaining a number AX lying between two adjacent numbers A1 and A2 by a computer as described above, the method based on the flow chart of FIG. 18 is usually employed.

In FIG. 18, 1801 is a first load step, 1802 is a second load step, 1803 is a third load step, 1804 is a fourth load step, 1805 is a first multiplication step, 1806 is a subtraction step, 1807 is a second multiplication step, 1808 is an addition step, and 1809 is an output step.

The operation of the flow chart of FIG. 18 will be described below.

The two input sample values A1 and A2 and parameter w are loaded into a register A, a register B, and a register C in the first load step 1801, the second load step 1802, and the third load step 1803, respectively, and a numeric value 1 is loaded into a register D in the fourth load step 1804.

Next, in the first multiplication step 1805, the contents of the register A is multiplied by the contents of the register C. After the multiplication, $(w \times A1)$ is held in the register A.

In the subtraction step 1806, the contents of the register C is subtracted from the contents of the register D. After the subtraction, $(1-w)$ is held in the register D.

In the second multiplication step 1807, the contents of the register B is multiplied by the contents of the register D. After the multiplication, $(1-w) \times A2$ is held in the register B.

In the addition step 1808, the contents of the register B is added to the contents of the register A. After the addition, $(w \times A1 + (1-w) \times A2)$ is held in the register A.

Finally, in the output step 1809, AX, that is, $(w \times A1 + (1-w) \times A2)$, is output.

In this example, the operations necessary to obtain one number AX are four load operations, two multiplication operations, a subtraction, and an addition.

With recent advances in computer technology, it has become possible to accomplish the above-described sample data conversion at relatively high speed not only by dedicated hardware but also by personal computers (PCs).

However, in the above prior art which is directed to the processing of moving image data that does not have a real time requirement, the following problem occurs (1) if the PC does not have sufficient performance for handling moving images or, (2) even if the PC has sufficient performance as mentioned above, when interrupt processing occurs during moving image processing, though in the latter case there will be no problem when the PC processes only moving image data.

That is, since the amount of moving image data is very large, there can occur cases where the processing of the input moving image data for playback or for recording on a recording medium such as a hard disk cannot be completed in time, and in such cases, processing of part of the data has had to be given up. This has lead to the problem that when recording moving images on a hard disk, part of a scene is dropped or the recording of image data itself is stopped.

Furthermore, in the sample number conversion of the above-mentioned prior art, when performing the upsampling, data must be interpolated so that all samples after the conversion will be contained.

As a result, the number of samples in the upsampled data sequence is the least common multiple of the number of samples before the conversion and the number of samples after the conversion.

However, even when the number of samples before the conversion, M, and the number of samples after the conversion, N, are both small, if M and N are natural numbers relatively prime to each other, the number of samples in the upsampled data sequence is M×N, which can become a large number depending on the case. In that case, a memory having a very large capacity is needed in order to hold the upsampled data sequence.

Furthermore, in that case, the upsampling requires an enormous number of multiplications and subtractions, which means that an enormous amount of computation is required to accomplish the upsampling. This also means an enormous amount of computation for decimation including low-pass filtering.

Since such an enormous amount of computation becomes necessary, an enormous amount of time for computation is required. This can become a fatal shortcoming in processing video signals or audio signals when real time processing is required.

DISCLOSURE OF THE INVENTION

It is an object of the present invention to provide a data processing method and a data processing apparatus that can reduce data dropping, compared with the prior art, during playback or recording of moving image data when moving images prerecorded on a recording medium or the like and having no real time requirement are input to a conventional personal computer for processing.

Further, as described above, the prior art has had the problem that a large capacity memory and an enormous amount of computation are required when converting an input digital signal consisting of an arbitrary number of samples into an output digital signal consisting of an arbitrary number of samples that is different from the number of samples in the input digital signal; in view of this problem, it is another object of the present invention to provide a data processing method and a data processing apparatus that can accomplish the conversion with a small memory capacity and a small amount of computation when converting an input digital signal consisting of an arbitrary number of samples into an output digital signal consisting of an arbitrary number of samples that is different from the number of samples forming the input digital signal.

A 1st invention of the present invention is a data processing method for processing moving image data by reading and inputting said moving image data from another recording medium, comprising:

a moving image input step for inputting said moving image data for each prescribed unit;

a position information input step for inputting information concerning a position at which said prescribed unit of moving image data is recorded on said recording medium;

a moving image processing step for processing said moving image for each said prescribed unit;

a discontinuity point storing step for storing position information concerning a location of the processing unit of last moving image data that has successfully been processed without interruption, or a position preceding said location, as a discontinuity point when there occurs moving image data that cannot be processed in said moving image processing step;

a re-input step for rereading and re-inputting previously readout moving image data and position information by controlling said recording medium; and a processing resuming step for detecting position information that matches the position information of said discontinuity point from among the position information input in said re-input step, and for resuming said moving image processing by using said detected position information.

A 2nd invention of the present invention is a data processing apparatus for processing moving image data by reading and inputting said moving image data from another recording medium, comprising:

moving image input means for inputting said moving image data for each prescribed unit;

position information input means for inputting information concerning a position at which said prescribed unit of moving image data is recorded on said recording medium;

moving image processing means for processing said moving image for each said prescribed unit;

discontinuity point storing means for storing position information concerning a location of the processing unit of last moving image data that has successfully been processed without interruption, or a position preceding said location, as a discontinuity point when there occurs moving image data that cannot be processed by said moving image processing means;

re-input means for rereading and re-inputting previously readout moving image data and position information by controlling said recording medium; and processing resuming means for detecting position information that matches the position information of said discontinuity point from among the position information input by said re-input means, and for resuming said moving image processing by using said detected position information.

A 3rd invention of the present invention is a data processing method according to said 1st invention, wherein said another recording medium is a video tape, and said information concerning said position is information concerning a record time counted from a prescribed position on said video tape.

A 4th invention of the present invention is a data processing apparatus according to said 2nd invention, wherein said another recording medium is a video tape, and said information concerning said position is information concerning a record time counted from a prescribed position on said video tape.

A 5th invention of the present invention is a data processing method for processing moving image data by reading and inputting said moving image data from another recording medium, comprising:

a moving image input step for inputting said moving image data for each prescribed unit;

a recorded time information input step for inputting information concerning time at which said prescribed unit of moving image data was recorded on said recording medium;

a moving image processing step for processing said moving image for each said prescribed unit;

a discontinuity point storing step for storing recorded time information concerning a location of the processing unit of last moving image data that has successfully been processed without interruption, or a position preceding said location, as a discontinuity point when there occurs moving image data that cannot be processed in said moving image processing step;

a re-input step for rereading and re-inputting previously readout moving image data and recorded time information by controlling said recording medium; and a processing resuming step for detecting recorded time information that matches the recorded time information of said discontinuity point from among the recorded time information input in said re-input step, and for resuming said moving image processing by using said detected recorded time information.

A 6th invention of the present invention is a data processing apparatus for processing moving image data by reading and inputting said moving image data from another recording medium, comprising:

moving image input means for inputting said moving image data for each prescribed unit;

recorded time information input means for inputting information concerning the time at which said prescribed unit of moving image data was recorded on said recording medium;

moving image processing means for processing said moving image for each said prescribed unit;

discontinuity point storing means for storing recorded time information concerning a location of the processing unit of last moving image data that has successfully been processed without interruption, or a position preceding said location, as a discontinuity point when there occurs moving image data that cannot be processed by said moving image processing means;

re-input means for rereading and re-inputting previously readout moving image data and recorded time information by controlling said recording medium; and processing resuming means for detecting recorded time information that matches the recorded time information of said discontinuity point from among the recorded time information input by said re-input means, and for resuming said moving image processing by using said detected recorded time information.

A 7th invention of the present invention is a data processing method for inputting and processing moving image data, comprising:

a moving image input step for inputting said moving image data for each prescribed unit;

a playback time information input step for inputting information concerning time at which said moving image data is to be played back for each said prescribed unit;

a moving image processing step for processing said moving image for each said prescribed unit;

a discontinuity point storing step for storing playback time information concerning the location of the processing unit of last moving image data that has successfully been processed without interruption, or a position preceding said location, as a discontinuity point when there occurs moving image data that cannot be processed in said moving image processing step;

a re-input step for re-inputting said moving image data and said playback time information; and a processing resuming step for detecting playback time information that matches the playback time information of said discontinuity point from among the playback time information input in said re-input step, and for resuming said moving image processing by using said detected playback time information.

An 8th invention of the present invention is a data processing apparatus for inputting and processing moving image data, comprising:

moving image input means for inputting said moving image data for each prescribed unit;

playback time information input means for inputting information concerning time at which said moving image data is to be played back for each said prescribed unit;

moving image processing means for processing said moving image for each said prescribed unit;

discontinuity point storing means for storing playback time information concerning the location of the processing unit of last moving image data that has successfully been processed without interruption, or a position preceding said location, as a discontinuity point when there occurs moving image data that cannot be processed by said moving image processing means;

re-input means for re-inputting said moving image data and said playback time information; and processing resuming means for detecting playback time information that matches the playback time information of said discontinuity point from among the playback time information input by said re-input means, and for resuming said moving image processing by using said detected playback time information.

A 9th invention of the present invention is a data processing method according to said 1st, 5th, or 7th invention, wherein when performing said moving image processing by temporarily storing said moving image data in a buffer, said discontinuity point storing step detects a condition in which new moving image data is input into an area of said buffer, the processing of moving image data in said area is not yet finished.

A 10th invention of the present invention is a data processing apparatus according to said 2nd, 6th, or 8th invention, wherein when performing said moving image processing by temporarily storing said moving image data in a buffer, said discontinuity point storing means detects a condition in which new moving image data is input into an area of said buffer, the processing of moving image data in said area is not yet finished.

An 11th invention of the present invention is a data processing method according to said 1st, 5th, or 7th invention, wherein said another recording medium is a video tape, and in said re-input step, when performing said moving image data playing back, said moving image data is played back once again after rewinding said video tape to a desired playback position.

A 12th invention of the present invention is a data processing apparatus according to said 2nd, 6th, or 8th invention, wherein said another recording medium is a video tape, and when performing said moving image data playing back, said re-input means plays back said moving image data once again after rewinding said video tape to a desired playback position.

A 13th invention of the present invention is a data processing method for taking as an input a moving image consisting of N input frames per prescribed time, and for processing M frames per said prescribed time, comprising:

a register value initializing step for setting an initial value in a designated register;

a register value addition step for adding a constant m (where m=M or m=−M) to said register value when said input frame is input; and an input frame processing step for (1) subtracting N from said register value and processing said input frame when said register value is not smaller than a prescribed value T as a result of said register value addition step in the case of said constant m=M, or (2) adding N to said register value and processing said input frame when said register value is not larger than said prescribed value T as a result of said register value addition step in the case of said constant m=−M.

A 14th invention of the present invention is a data processing apparatus for taking as an input a moving image consisting of N input frames per prescribed time, and for processing M frames per said prescribed time, comprising:

register value initializing means for setting an initial value in a designated register;

register value adding means for adding a constant m (where m=M or m=−M) to said register value when said input frame is input; and input frame processing means for (1) subtracting N from said register value and processing said input frame when said register value is not smaller than a prescribed value T as a result of the addition by said register value adding means in the case of said constant m=M, or (2) adding N to said register value and processing said input frame when said register value is not larger than said prescribed value T as a result of the addition by said register value adding means in the case of said constant m=−M.

A 15th invention of the present invention is a data processing method for taking as an input a moving image consisting of N input frames per prescribed time, and for processing M frames per said prescribed time, comprising:

a register value initializing step for setting an initial value not larger than N in a designated register;

a first frame processing step for processing first input frame when said first input frame is input;

a register value addition step for adding a constant m (where m=M or m=−M) to said register value when said input frame other than said first input frame is input; and an input frame processing step for (1) subtracting N from said register value and processing said input frame when said register value is not smaller than a prescribed value T as a result of said register value addition step in the case of said constant m=M, or (2) adding N to said register value and processing said input frame when said register value is not larger than said prescribed value T as a result of said register value adding means [sic; step] in the case of said constant m=−M.

A 16th invention of the present invention is a data processing apparatus for taking as an input a moving image consisting of N input frames per prescribed time, and for processing M frames per said prescribed time, comprising:

register value initializing means for setting an initial value not larger than N in a designated register;

first frame processing means for processing first input frame when said first input frame is input;

register value adding means for adding a constant m (where m=M or m=−M) to said register value when said input frame other than said first input frame is input; and input frame processing means for (1) subtracting N from said register value and processing said input frame when said register value is not smaller than a prescribed value T as a result of the addition by said register value adding means in the case of said constant m=M, or (2) adding N to said register value and processing said input frame when said register value is not larger than said prescribed value T as a result of the addition by said register value adding means in the case of said constant m=−M.

A 17th invention of the present invention is a data processing method for taking as an input a moving image consisting of N input frames per prescribed time, and for processing M frames per said prescribed time, comprising:

a number-of-processing-frames initializing step for setting an initial value M representing the number of M frames;

a register value initializing step for setting an initial value not larger than N in a designated register;

a register value addition step for adding a constant m (where m=M or m=−M) to said register value when said input frame is input;

an input frame processing step for (1) subtracting N from said register value and processing said input frame when said register value is not smaller than a prescribed value T as a result of said register value addition step in the case of said constant m=M, or (2) adding N to said register value and processing said input frame when said register value is not larger than said prescribed value T as a result of said register value addition step in the case of said constant m=−M; and a number-of-processing-frames adjusting step for varying said number of processing frames, M, and said constant m in accordance with the degree of load in said input frame processing step.

An 18th invention of the present invention is a data processing apparatus for taking as an input a moving image consisting of N input frames per prescribed time, and for processing M frames per said prescribed time, comprising:

number-of-processing-frames initializing means for setting an initial value M representing the number of M frames;

register value initializing means for setting an initial value not larger than N in a designated register;

register value adding means for adding a constant m (where m=M or m=−M) to said register value when said input frame is input;

input frame processing means for (1) subtracting N from said register value and processing said input frame when said register value is not smaller than a prescribed value T as a result of the addition by said register value adding means in the case of said constant m=M, or (2) adding N to said register value and processing said input frame when said register value is not larger than said prescribed value T as a result of the addition by said register value adding means in the case of said constant m=−M; and number-of-processing-frames adjusting means for varying said number of processing frames, M, and said constant m in accordance with the degree of load in said input frame processing means.

A 19th invention of the present invention is a data processing method according to said 13th, 15th, or 17th invention wherein in the case of said constant m=M, T=N or T=N+1 is set as said prescribed value T, while in the case of said constant m=−M, T=0 or T=−1 is set as said prescribed value T.

A 20th invention of the present invention is a data processing apparatus according to said 14th, 16th, or 18th invention wherein in the case of said constant m=M, T=N or T=N+1 is set as said prescribed value T, while in the case of said constant m=−M, T=0 or T=−1 is set as said prescribed value T.

A 21st invention of the present invention is a data processing method according to said 17th invention, wherein when performing moving image processing by temporarily storing moving image data in a buffer, in said number-of-processing-frames adjusting step, (1) said number of processing frames is reduced when the amount of moving image data remaining unprocessed in said buffer shows a tendency to increase, and (2) said number of processing frames is increased when the amount of moving image data remaining unprocessed in said buffer shows a tendency to decrease.

A 22nd invention of the present invention is a data processing apparatus according to said 18th invention, wherein when performing moving image processing by temporarily storing moving image data in a buffer, said number-of-processing-frames adjusting means (1) reduces said number of processing frames when the amount of moving image data remaining unprocessed in said buffer shows a tendency to increase, and (2) increases said number of processing frames when the amount of moving image data remaining unprocessed in said buffer shows a tendency to decrease.

A 23rd invention of the present invention is a data processing method according to said 17th invention, wherein when performing moving image processing by temporarily storing moving image data in a buffer, only moving image data to be actually processed is stored in said buffer.

A 24th invention of the present invention is a data processing apparatus according to said 18th invention, wherein when performing moving image processing by temporarily storing moving image data in a buffer, only moving image data to be actually processed is stored in said buffer.

A 25th invention of the present invention is a data processing method for converting an input sample data sequence consisting of M samples to an output sample data sequence consisting of N samples, comprising:

an initial value setting step for setting a nonzero constant k and a prescribed parameter W;

a sequential addition step for repeating an operation to add $k*N$ to said parameter W by sequentially scanning input sample data as long as $W \leq 0$ when k>0 or as long as $W \geq 0$ when k<0;

a sample data output step for outputting said converted output sample data when W becomes larger than 0 in the case of k>0 or W becomes smaller than 0 in the case of k>0 in said sequential addition step; and a subtraction step for subtracting $k*M$ from said W, wherein said sequential addition step, said sample data output step, and said subtraction step are repeated until said N output sample data have been output.

A 26th invention of the present invention is a data processing method according to said 25th invention, wherein when each sample data in said output sample data sequence has a byte length represented by a prescribed constant b, and an overall byte length of said output sample data sequence is not an integral multiple of a prescribed constant p, there is further included a dummy adding step for adding dummy data of $L-b*N$ bytes at end of said output sample data sequence of N samples, where L is a multiple of p not smaller than $b*N$, and said output sample data sequence of N samples is output together with said dummy data.

A 27th invention of the present invention is a data processing method according to said 25th invention, wherein said k is 1.

A 28th invention of the present invention is a data processing method according to said 25th invention, wherein said k is the reciprocal of the greatest common measure of said M and said N.

A 29th invention of the present invention is a data processing method comprising:

a data input step for inputting data of two predetermined numbers X1 and X2;

a parameter input step for inputting a parameter w for obtaining a number Y located at a position at which the distance between said X1 and said X2 is divided in a ratio of (1−w): w;

a subtraction step for generating X3 by subtracting said X2 from said X1;

a times w multiplying step for generating X4 by multiplying the X3 obtained in said subtraction step by said parameter w;

an addition step for generating Y by adding said X2 to the X4 obtained in said times w multiplying step; and an output step for outputting said Y obtained in said addition step.

A 30th invention of the present invention is a data processing method for inputting N data sequences X[i] [sic; for inputting data sequence X[i] including N data], and for outputting as Y[i] a value obtained by dividing said X[i] by a constant Q, comprising:

an initializing step for obtaining a coefficient $w=2^{\wedge}k/Q$ (where ^k means raising to the power k) for an integer k larger than 0;

a times w multiplying step for obtaining $w*X[i]$ using said X[i] and said coefficient w obtained in said initializing step, and for taking said obtained $w*X[i]$ as a new X[i]; and a bit shift step for taking as Y[i] a value obtained by shifting the X[i] obtained in said times w multiplying step by k bits in a low order bit direction when said X[i] is expressed in bit representation, wherein said times w multiplying step and said bit shift step are repeated N times to sequentially output N data sequences Y[i] [sic; to sequentially output data sequence Y[i] including N data].

A 31st invention of the present invention is a data processing apparatus for converting an input sample data sequence consisting of M samples to an output sample data sequence consisting of N samples, comprising:

initial value setting means for setting a nonzero constant k and a prescribed parameter W;

sequential adding means for repeating an operation to add $k*N$ to said parameter W by sequentially scanning input sample data as long as $W \leq 0$ when k>0 or as long as $W \geq 0$ when k<0;

sample data output means for outputting said converted output sample data when W becomes larger than 0 in the case of k>0 or W becomes smaller than 0 in the case of k<0 by said sequential adding means; and subtracting means for subtracting k*M from said W, wherein said sequential adding means, said sample data output means, and said subtracting means are operated in sequence repeatedly until said N output sample data have been output.

A 32nd invention of the present invention is a data processing apparatus according to said 31st invention, wherein when each sample data in said output sample data sequence has a byte length represented by a prescribed constant b, and an overall byte length of said output sample data sequence is not an integral multiple of a prescribed constant p, there is further included a dummy adding means for adding dummy data of L−b*N bytes at end of said output sample data sequence of N samples, where L is a multiple of p not smaller than b*N, and said output sample data sequence of N samples is output together with said dummy data.

A 33rd invention of the present invention is a data processing apparatus according to said 31st invention, wherein said k is 1.

A 34th invention of the present invention is a data processing apparatus according to said 31st invention, wherein said k is the reciprocal of the greatest common measure of said M and said N.

A 35th invention of the present invention is a data processing apparatus comprising:

data input means for inputting data of two predetermined numbers X1 and X2;

parameter input means for inputting a parameter w for obtaining a number Y located at a position at which the distance between said X1 and said X2 is divided in a ratio of (1−w):w;

subtracting means for generating X3 by subtracting said X2 from said X1;

times w multiplying means for generating X4 by multiplying the X3 obtained by said subtracting means by said parameter w;

adding means for generating Y by adding said X2 to the X4 obtained by said times w multiplying means; and output means for outputting said Y obtained by said adding means.

A 36th of the present invention is a data processing apparatus for inputting N data sequences X[i] [sic; for inputting data sequence X[i] including N data], and for outputting as Y[i] a value obtained by dividing said X[i] by a constant Q, comprising:

initializing means for obtaining a coefficient w=2^k/Q (where ^k means raising to the power k) for an integer k larger than 0;

times w multiplying means for obtaining w*X[i] using said X[i] and said coefficient w obtained by said initializing means, and for taking said obtained w*X[i] as a new X[i]; and bit shift means for taking as Y[i] a value obtained by shifting the X[i] obtained by said times w multiplying means by k bits in a low order bit direction when said X[i] is expressed in bit representation, wherein said times w multiplying means and said bit shift means are operated in sequence N times to sequentially output N data sequences Y[i] [sic; to sequentially output data sequence Y[i] including N data].

A 37th invention of the present invention is a program recording medium having recorded thereon a program for enabling a computer to carry out all or part of operations in all or part of the steps of a data processing method as described in any one of said 1st, 3rd, 5th, 7th, 9th, 11th, 13th, 15th, 17th, 19th, 21st, 23rd, and 25th to 30th inventions.

A 38th invention of the present invention is a program recording medium having recorded thereon a program for enabling a computer to implement all or part of the functions of all or part of the means in a data processing apparatus as described in any one of said 2nd, 4th, 6th, 8th, 10th, 12th, 14th, 16th, 18th, 20th, 22nd, 24th, and 31st to 36th inventions.

DESCRIPTION OF REFERENCE NUMERALS

101. Position Information Input Block
102. Discontinuity Point Storing Block
103. Re-input Block
104. Processing Resuming Block
105. Moving Image Input Block
106. Image Storage Processing Block
201. Recorded Time Information Input Block
202. Discontinuity Point Storing Block
301. Playback Time Information Input Block
302. Discontinuity Point Storing Block
401. Register Value Initializing Block
402. Register
403. Moving Image Input Block
404. Register Value Adding Block
405. Register Value Subtracting Block

406. Image Processing Block
501. Register Value Initializing Block
502. First Frame Processing Block
601. Number-of-processing-frames Initializing Block
602. Number-of-processing-frames Adjusting Block

BEST MODE FOR CARRYING OUT THE
INVENTION

Embodiments of the present invention will be described below with reference to drawings.

(Embodiment 1)

Figure 1:
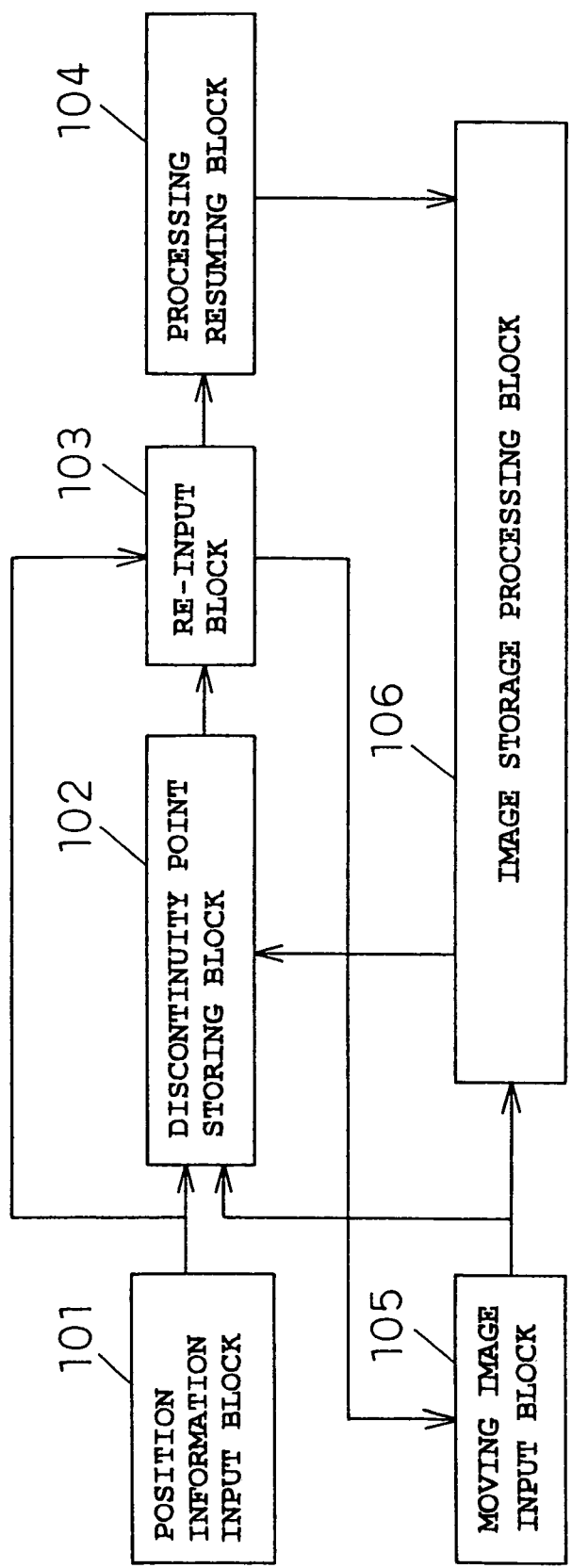
FIG. 1 is a block diagram showing a first embodiment of the present invention.

FIG. 1 is a block diagram showing the configuration of a data processing apparatus according to a first embodiment of the present invention.

In FIG. 1, reference numeral 101 is a position information input block, 102 is a discontinuity point storing block, 103 is a re-input block, 104 is a processing resuming block, 105 is a moving image input block, and 106 is an image storage processing block.

Next, the operation of this embodiment will be described along with a data processing method constituting one embodiment of the present invention.

The following description of this embodiment deals with processing in which moving image data recorded on a video tape recorder is played back and stored on a hard disk of a personal computer.

First, the moving image data played back on the video tape recorder and input via the moving image input block 105 is supplied to the image storage processing block 106. The image storage processing block 106 stores the input moving image data in the form of a file on the hard disk. Depending on the case, the input moving image can be presented for viewing on the display of the personal computer.

The moving image data output from the moving image input block 105 contains position information. This position information is supplied to the discontinuity point storing block 102 via the image storage processing block 106.

On the other hand, position information indicating the position at which the processing of the moving image data is to be started is supplied from the position information input block 101 to the discontinuity point storing block 102. The position information indicating the starting position may be specified by the user, or position information on the video tape first acquired after starting the processing may be used as the position information.

One example of the position information, in the case of home digital video tape recorders conforming to the DV standard, is the ATN (absolute track number) value, which is output as a digital playback output together with the moving image data.

The discontinuity point storing block 102 monitors the processing progressing in the image storage processing block 106 and, if, in the input moving image data, there is any data that failed to be processed in time, the position information corresponding to the last moving image data that has been processed normally is stored as a discontinuity point.

Usually, input moving image data is temporarily stored in a buffer first, and then subjected to image processing. It is therefore possible to detect that the data has failed to be processed in time by detecting new input moving image data having been written over a buffer area where the moving image data remaining unprocessed is held.

Here, the discontinuity point which serves as the position information corresponding to the last successfully processed moving image data must be set so as to indicate the location of the processing unit of the last moving image data that has successfully been processed, or a position preceding that location, by considering the following point.

That is, the discontinuity point is set at the location of the processing unit of the last moving image data that has successfully been processed, or at a position preceding that location, by considering the influences of the VTR tape speed and of the acceleration and deceleration of the tape reel as well as the fact that the accuracy for rewinding the tape to the position where the target ATN value is recorded depends on the acceleration and deceleration characteristics of the servo motor.

When such a discontinuity point occurs, the image processing is temporarily suspended, and the re-input block 103 causes the video tape recorder being played back to be rewound via the moving image input block 105 and restarts the moving image input.

The processing resuming block 104 compares the discontinuity point stored in the discontinuity point storing block 102 with the position information supplied via the image storage processing block 106 through the discontinuity point storing block 102 and re-input block 103. When both match as the result of the comparison, the processing resuming block 104 allows the image storage processing block 106 to process moving image data that is input temporally following the detection position of the position information that matched.

As described above, in the first embodiment of the present invention, if image processing has failed to be completed in time, the processing can be restarted by utilizing the information concerning the recording place (position) being played back on the video tape recorder.

More specifically, if the image processing is interrupted due to the occurrence of interrupt processing in the personal computer, since a chance is given to resume the image processing from the point preceding the point at which the image processing was interrupted, the correctly continuing image processing can be accomplished at the second try unless the interrupt processing occurs again. If the image processing is interrupted again, as similar to the above, re-processing is performed once again.

Generally, it has been difficult for a personal computer to handle moving image data continuing for a long time because handling moving images imposes a very large load on the personal computer. By contrast, in the present invention, if the processing is interrupted, since the processing can be resumed from the correct position once again, the eventually processed data (the data stored on the hard disk) is equivalent to data that would have been correctly processed continuously.

In the present embodiment, a position on the recorded tape is used as the position information, but it will be appreciated that the record time from a prescribed position on the tape can also be used as the information for specifying a position on the tape.

(Embodiment 2)

Figure 2:
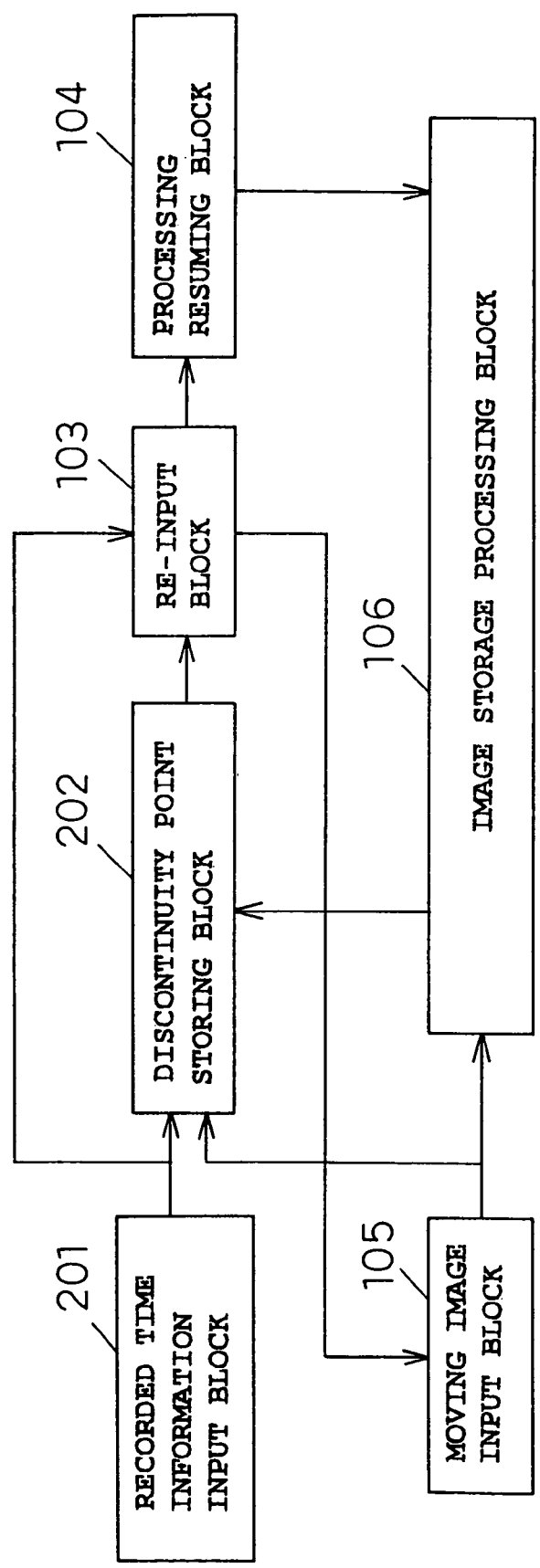
FIG. 2 is a block diagram showing a second embodiment of the present invention.

FIG. 2 is a block diagram showing the configuration of a data processing apparatus according to a second embodiment of the present invention.

In FIG. 2, reference numeral 201 is a recorded time information input block, 202 is a discontinuity point storing block, 103 is a re-input block, 104 is a processing resuming block, 105 is a moving image input block, and 106 is an image storage processing block.

Next, the operation of the embodiment of FIG. 2 will be described along with a data processing method constituting one embodiment of the present invention.

This embodiment uses recorded time information as an example of the position information described in the first embodiment, and the functions of the respective blocks are fundamentally the same as those in the foregoing embodiment. The recorded time information here refers to information concerning the time at which input moving image data was recorded.

First, the moving image data input via the moving image input block 105 is supplied to the image storage processing block 106. The image storage processing block 106 stores the input moving image data in the form of a file on the hard disk.

On the other hand, the recorded time information as the position information indicating the position at which the processing of the moving image data is to be started is input from the recorded time information input block 201 to the discontinuity point storing block 202.

In the case of home digital video tape recorders conforming to the DV standard, this recorded time information is called "RecTime", and is output as a digital playback output together with the moving image data. The recorded time information is supplied to the discontinuity point storing block 202 via the image storage processing block 106, as in the foregoing embodiment.

The discontinuity point storing block 202 monitors the processing progressing in the image storage processing block 106 and, if, in the input moving image data, there is any data that failed to be processed in time, the recorded time information for the last moving image data that has been processed normally is stored as a discontinuity point.

When such a discontinuity point occurs, the image processing is temporarily suspended, and the re-input block 103 causes the video tape recorder being played back to be rewound via the moving image input block 105 and restarts the moving image input.

The processing resuming block 104 compares the discontinuity point stored in the discontinuity point storing block 202 with the recorded time information supplied via the image storage processing block 106 through the discontinuity point storing block 202 and re-input block 103, and when both match as the result of the comparison, the processing resuming block 104 allows the image storage processing block 106 to process moving image data that is input temporally following the detection position of the recorded time information that matched.

As described above, in the second embodiment of the present invention, if image processing has failed to be completed in time, the processing can be restarted by utilizing the information concerning the recorded time of the video tape recorder being played back, as in the foregoing embodiment.

(Embodiment 3)

Figure 3:
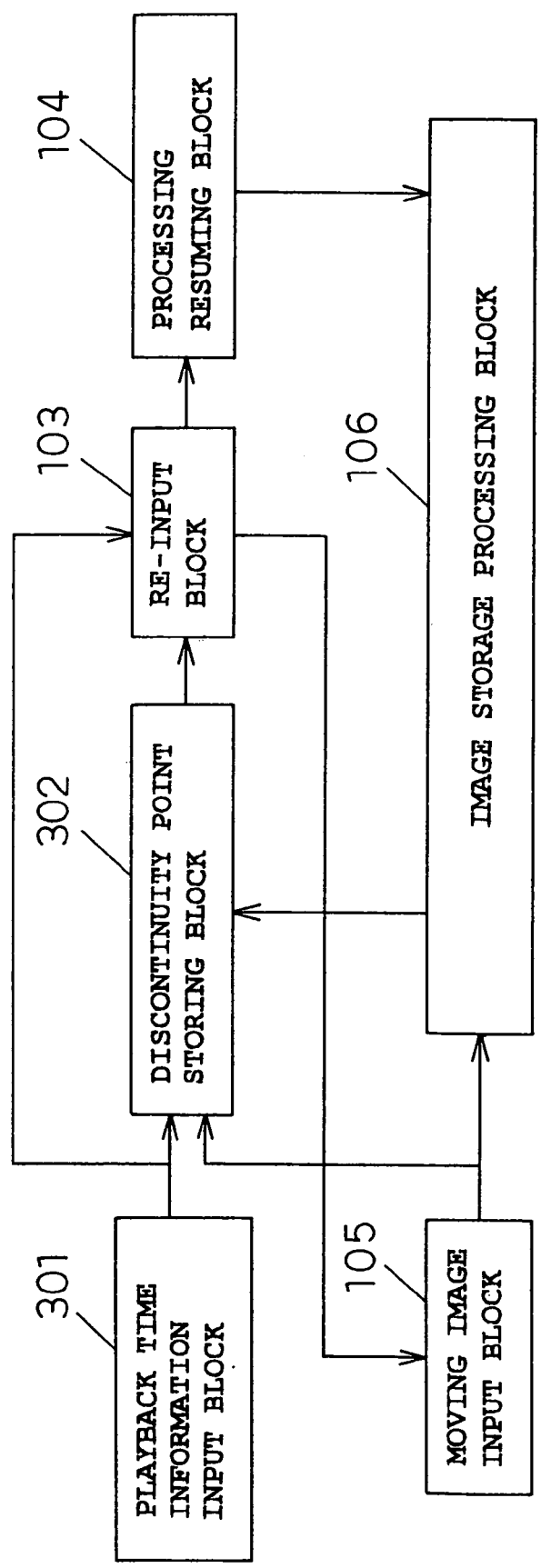
FIG. 3 is a block diagram showing a third embodiment of the present invention.

FIG. 3 is a block diagram showing the configuration of a data processing apparatus according to a third embodiment of the present invention.

In FIG. 3, reference numeral 301 is a playback time information input block, 302 is a discontinuity point storing block, 103 is a re-input block, 104 is a processing resuming block, 105 is a moving image input block, and 106 is an image storage processing block.

Next, the operation of the embodiment of FIG. 3 will be described along with a data processing method constituting one embodiment of the present invention.

This embodiment uses playback time information as an example of the position information described in the first embodiment, and the functions of the respective blocks are fundamentally the same as those in the foregoing embodiment. The playback time information here refers to information concerning the time at which the input moving image data is to be played back.

First, the moving image data input via the moving image input block 105 is supplied to the image storage processing block 106. The image storage processing block 106 stores the input moving image data in the form of a file on the hard disk.

On the other hand, the playback time information, which serves as the position information indicating the position at which the processing of the moving image data is to be started, is input from the playback time information input block 301 to the discontinuity point storing block 302.

The playback time information is often appended to data, such as MPEG compressed moving image data, in which the order of transmit time and the order of playback time differ from one frame to the next. The playback time information is supplied to the discontinuity point storing block 302 via the image storage processing block 106, as in the foregoing embodiment.

The discontinuity point storing block 302 monitors the processing progressing in the image storage processing block 106 and, if, in the input moving image data, there is any data that failed to be processed in time, the playback time information for the last moving image data that has been processed normally is stored as a discontinuity point.

When such a discontinuity point occurs, the re-input block 103 causes the video tape recorder being played back to be rewound via the moving image input block 105 and restarts the moving image input.

The processing resuming block 104 compares the discontinuity point stored in the discontinuity point storing block 302 with the playback time information supplied via the image storage processing block 106 through the discontinuity point storing block 302 and re-input block 103. When both match as the result of the comparison, the processing resuming block 104 allows the image storage processing block 106 to process moving image data that is input temporally following the detection position of the playback time information that matched.

As described above, in the third embodiment of the present invention, if image processing has failed to be completed in time, the processing can be restarted by utilizing the moving image appended information concerning the time at which the data is to be played back.

(Embodiment 4)

Figure 4:
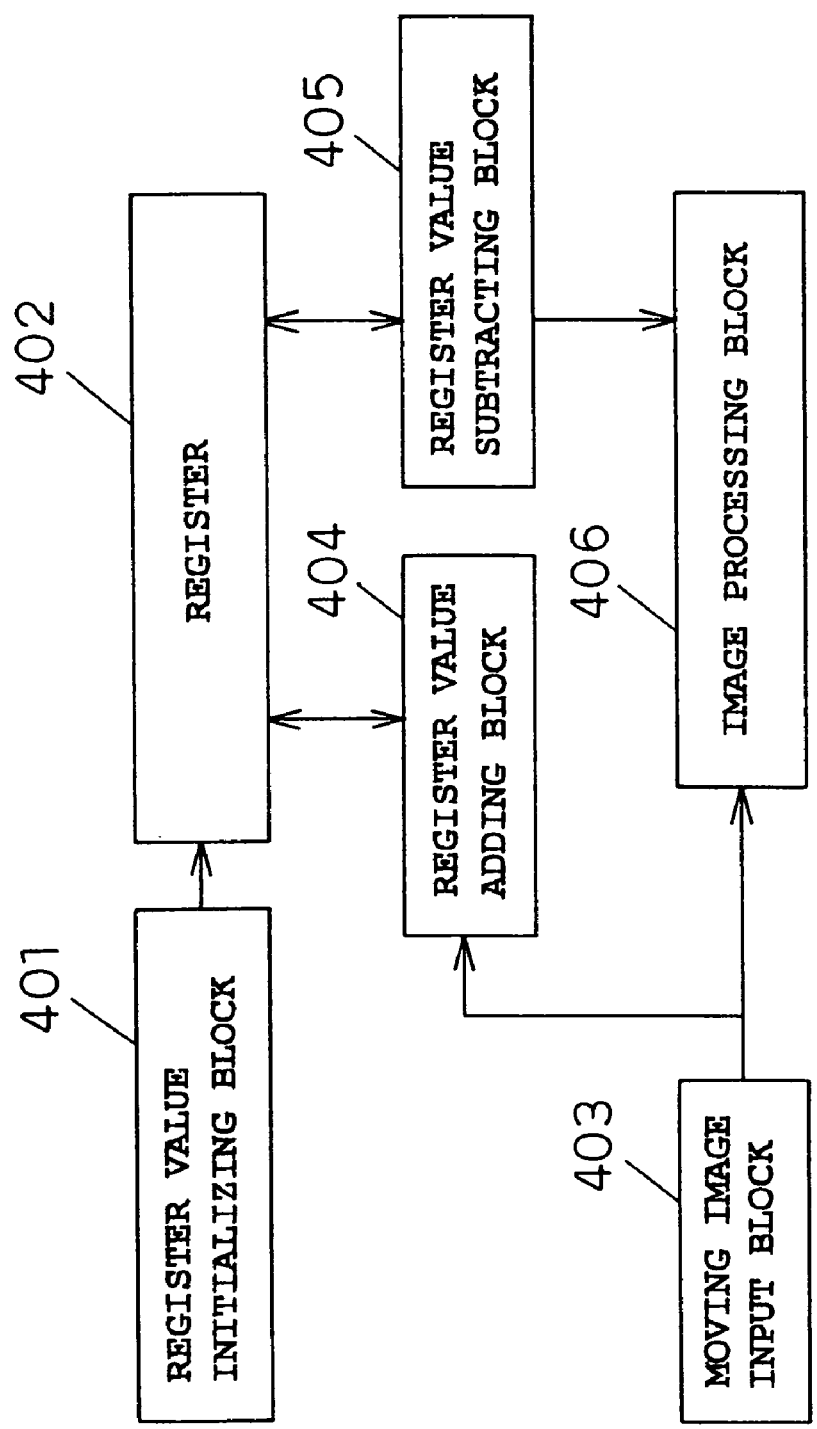
FIG. 4 is a block diagram showing a fourth embodiment of the present invention.

FIG. 4 is a block diagram showing the configuration of a data processing apparatus according to a fourth embodiment of the present invention.

This embodiment is applied when there is a limit on the image processing capacity for moving image data or on the recording capacity of recording media on the data processing apparatus side because of hardware constraints of the data processing apparatus. That is, this embodiment differs from the foregoing embodiments in that even when the amount of input image data is so large as to exceed the limit, degradation of image quality can be alleviated compared with the prior art by suitably decimating the input image data.

In FIG. 4, reference numeral 401 is a register value initializing block, 402 is a register, 403 is a moving image input block, 404 is a register value adding block, 405 is a register value subtracting block, and 406 is an image processing block.

Next, the operation of the embodiment of FIG. 4 will be described along with a data processing method constituting one embodiment of the present invention.

Input frames to be processed in this embodiment include already decoded frames, or MPEG compressed image data consisting only of I pictures, or DV data (intraframe coded data) or the like.

Here, the number of moving image frames input per second is denoted by N and the number of frames to be processed is denoted by M, while constant m is set equal to M. Since m=M, T=N is selected as a prescribed value T.

First, the value of the register 402 is initialized at a certain point in time by the register value initializing block 401. Here, the initial value is set as 0.

Next, the moving image data input via the moving image input block 403 is supplied to the image processing block 406. At the same time, the register value adding block 404 adds m to the value of the register 402 each time one frame data is input.

The register value subtracting block 405 detects the register value thus incremented by the register value adding block 404 and, if the value is not smaller than T=N, then subtracts N from the register value and supplies a processing instruction to the image processing block 406.

For the input moving image data, the image processing block 406 performs processing only on the frame data for which the processing instruction is supplied from the register value subtracting block 405.

The operation of the fourth embodiment will be described by taking as an example the case of N=30 and m=M=23 to simplify the explanation.

Table 1 shows how the register value changes with each input frame under the above conditions.

TABLE 1

| Input frame | Operation | Register value | Image processing |
| --- | --- | --- | --- |
| — | Register value initialization | 0 | |
| 0 | Register value addition (+23) | 23 | |
| | Register value subtraction (no processing) | 23 | |
| 1 | Register value addition (+23) | 46 | |
| | Register value subtraction (−30) | 16 | Processing of frame 1 |
| 2 | Register value addition (+23) | 39 | |
| | Register value subtraction (−30) | 9 | Processing of frame 2 |
| 3 | Register value addition (+23) | 32 | |
| | Register value subtraction (−30) | 2 | Processing of frame 3 |
| 4 | Register value addition (+23) | 25 | |
| | Register value subtraction (no processing) | 25 | |
| 5 | Register value addition (+23) | 48 | |
| | Register value subtraction (−30) | 18 | Processing of frame 5 |

In Table 1, it is assumed that the time elapses from the top row toward the bottom row.

In Table 1, first the register value is set to 0 by register value initialization.

Next, for each input of a new frame, 23 is added to the register value by the register value adding operation, and if the result is 30 or larger, 30 is subtracted from the register value by the register value subtracting operation. Image processing is performed on the input frame for which the register value subtracting operation is performed.

With the above processing, image processing is performed in the order of frames 1, 2, 3, 5, . . .

As a result, of the 30 frames of moving image input per second, seven frames are dropped, and the remaining 23 frames of moving image are selected for image processing.

In such a case, since 30 and 23 are prime relative to each other, if 23 frames per second are to be selected from the 30 frames per second while minimizing image quality degradation, the prior art would involve repeating trial and error so that the frames to be dropped would not be contiguous as much as possible. Accordingly, each time the number N of input frames or the number M of frames to be processed changes, a suitable way of frame decimation has had to be determined through trial and error.

By contrast, according to the present embodiment, the same conversion method can be applied at all times, irrespective of the number N of input frames or the number M of frames to be processed. Furthermore, the conversion can be accomplished by a very simple method involving only addition and subtraction operations for each frame.

It will be recognized here that N, M(m), and T can be set to other desired values than the values used in this embodiment.

(Embodiment 5)

Figure 5:
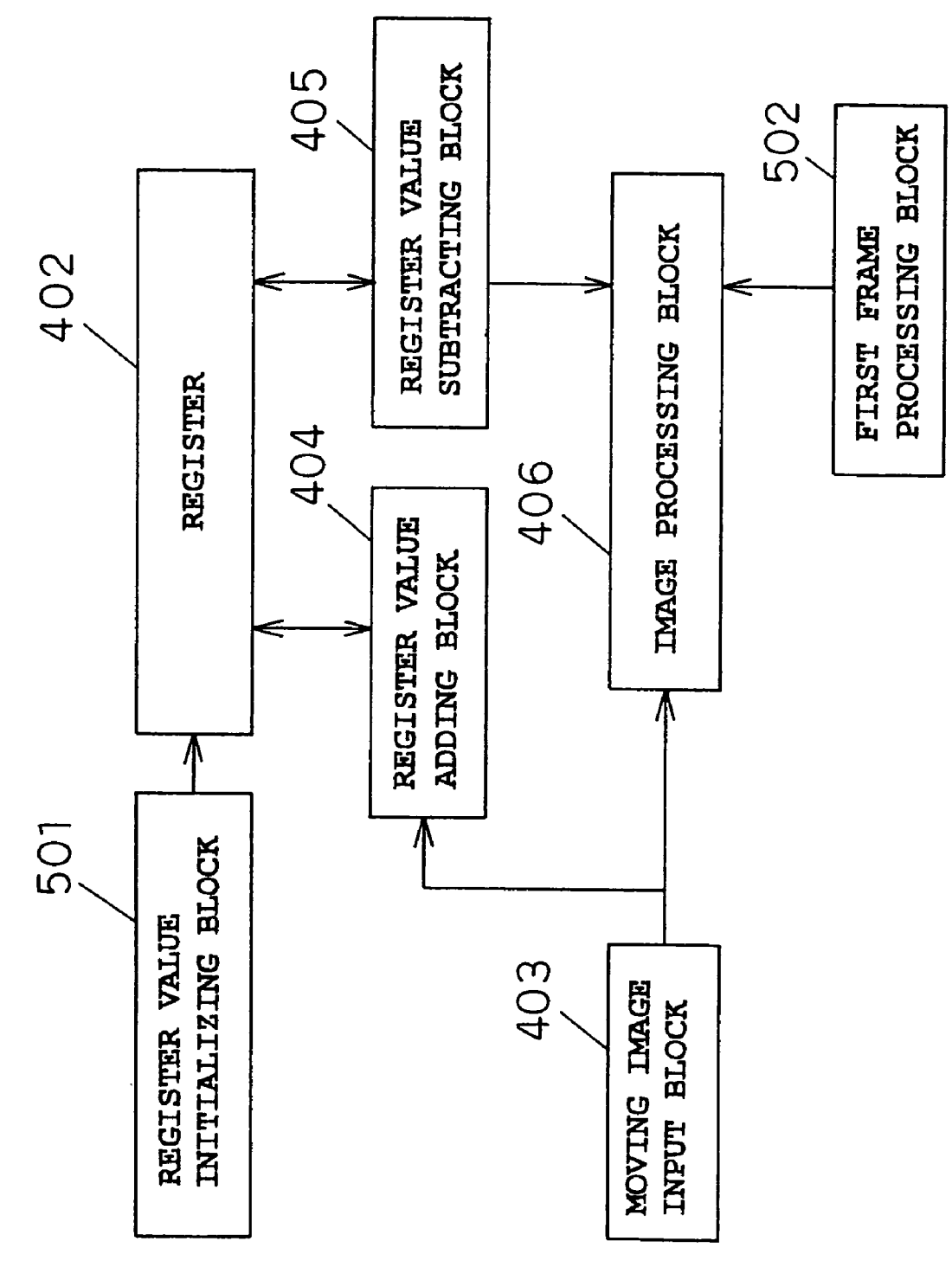
FIG. 5 is a block diagram showing a fifth embodiment of the present invention.

FIG. 5 is a block diagram showing the configuration of a data processing apparatus according to a fifth embodiment of the present invention.

In FIG. 5, reference numeral 501 is a register value initializing block, 402 is a register, 403 is a moving image input block, 404 is a register value adding block, 405 is a register value subtracting block, 406 is an image processing block, and 502 is a first frame processing block.

Next, the operation of the embodiment of FIG. 5 will be described along with a data processing method constituting one embodiment of the present invention.

Here, as in the foregoing fourth embodiment, the number of moving image frames input per second is denoted by N and the number of frames to be processed is denoted by M, while m is set equal to M and T is set equal to N.

First, the moving image data input via the moving image input block 403 is supplied to the image processing block 406.

When the first frame is input, the first frame processing block 502 initializes the value of the register 402 by using the register value initializing block 501, and supplies a processing instruction to the image processing block 406. Here, the initial value of the register is set to 0.

After that, the register value adding block 404 adds M to the value of the register 402 each time frame data is input, as in the foregoing fourth embodiment.

The register value subtracting block 405 detects the register value thus incremented by the register value adding block 404 and, if the value is not smaller than N, then subtracts N from the register value and supplies a processing instruction to the image processing block 406.

For the input moving image data, the image processing block 406 performs processing only on the frame data for which the processing instruction is supplied from the register value subtracting block 405.

The operation of the fifth embodiment will be described by taking as an example the case of N=30 and m=M=13 to simplify the explanation.

Table 2 shows how the register value changes with each input frame under the above conditions.

TABLE 2

| Input frame | Operation | Register value | Image processing |
|---|---|---|---|
| 0 | Register value initialization | 0 | |
|  | Processing of first frame | 0 | Processing of frame 0 |
| 1 | Register value addition (+13) | 13 | |
|  | Register value subtraction (no processing) | 13 | |
| 2 | Register value addition (+13) | 26 | |
|  | Register value subtraction (no processing) | 26 | |
| 3 | Register value addition (+13) | 39 | |
|  | Register value subtraction (−30) | 9 | Processing of frame 3 |
| 4 | Register value addition (+13) | 22 | |
|  | Register value subtraction (no processing) | 22 | |
| 5 | Register value addition (+13) | 35 | |
|  | Register value subtraction (−30) | 5 | Processing of frame 5 |
| 6 | Register value addition (+13) | 18 | |
|  | Register value subtraction (no processing) | 18 | |

In Table 2, it is assumed that the time elapses from the top row toward the bottom row.

In Table 2, when the first frame is input, the register value is set to 0 by register value initialization, and frame 0 is processed by the first frame processing.

Next, for each input of a new frame, 13 is added to the register value by the register value adding operation, and if the result is 30 or larger, 30 is subtracted from the register value by the register value subtracting operation. Image processing is performed on the input frame for which the register value subtracting operation is performed.

With the above processing, image processing is performed in the order of frames 0, 3, 5, . . .

As a result, of the 30 frames of moving image input per second, 17 frames are dropped, and the remaining 13 frames of moving image are selected for image processing.

In this way, in the fifth embodiment, the first input frame is always selected for image processing. Accordingly, even when the number of input frames is small, at least one frame is processed.

(Embodiment 6)

Figure 6:
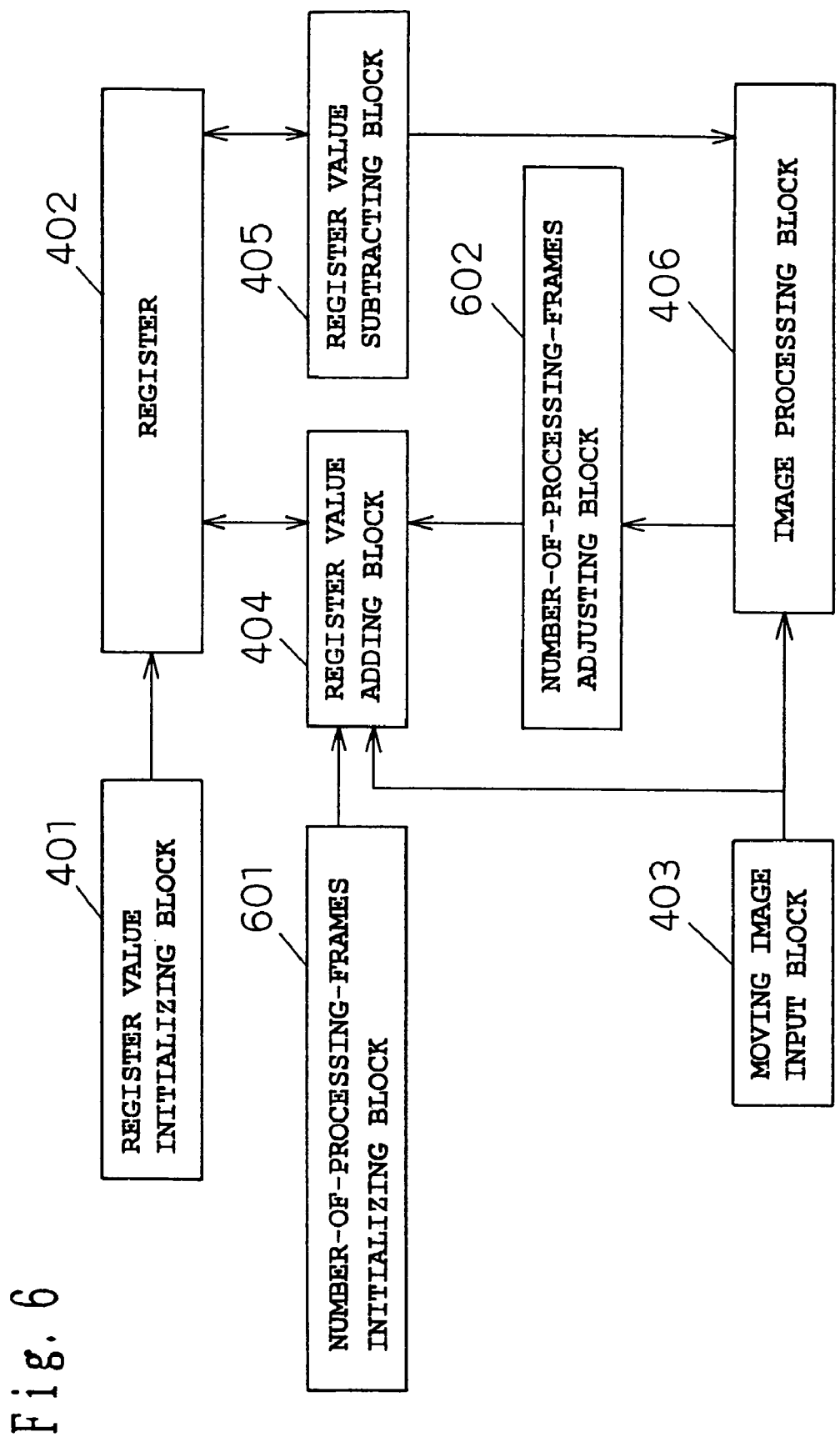
FIG. 6 is a block diagram showing a sixth embodiment of the present invention.

FIG. 6 is a block diagram showing the configuration of a data processing apparatus according to a sixth embodiment of the present invention.

In FIG. 6, reference numeral 401 is a register value initializing block, 402 is a register, 403 is a moving image input block, 404 is a register value adding block, 405 is a register value subtracting block, 406 is an image processing block, 601 is a number-of-processing-frames initializing block, and 602 is a number-of-processing-frames adjusting block.

The operation of the embodiment of FIG. 6 will be described along with a data processing method constituting one embodiment of the present invention.

Here, as in the foregoing fourth embodiment, the number of moving image frames input per second is denoted by N and the number of frames to be processed is denoted by M, while m is set equal to M and T is set equal to N.

First, the number-of-processing-frames initializing block 601 initializes the value M which is added by the register value adding block 404. Usually, N is set as M.

Next, the moving image data input via the moving image input block 403 is supplied to the image processing block 406. When the first frame is input, the register value initializing block 401 initializes the value of the register 402. Here, the initial value of the register is set to 0.

After that, the register value adding block 404 adds M to the value of the register 402 each time frame data is input.

The register value subtracting block 405 detects the register value thus incremented by the register value adding block 404 and, if the value is not smaller than N, then subtracts N from the register value and supplies a processing instruction to the image processing block 406. For the input moving image data, the image processing block 406 performs processing only on the frame data for which the processing instruction is supplied from the register value subtracting block 405.

If there occurs the possibility that the processing in the image processing block 406 may not be able to catch up with the input data, the number-of-processing-frames adjusting block 602 reduces the value M to be added by the register value adding block 404. Conversely, if there is sufficient time for processing, the value M(m) may be increased.

Whether there is sufficient time for processing in the image processing block 406 can be determined by processing buffer output after temporarily storing input data in a buffer, and by thereafter detecting the amount of data remaining unprocessed in the buffer.

If the amount of unprocessed input data shows a tendency to increase, the number of frames to be processed is reduced, and conversely, if the amount shows a tendency to decrease, the number of frames to be processed is increased; in this way, it becomes possible to make maximum use of the computing power.

It is also possible to reduce the buffer amount by making provision so that only frame data for which a processing instruction is issued is input to the buffer.

In this way, in the sixth embodiment, the number of frames to be actually processed can be dynamically adjusted according to the image processing load. This achieves optimum input processing for the computing power of the personal computer.

The fourth to sixth embodiments have been described for the case of m=M. For the case of m=−M, on the other hand, if provision is made so that the register value adding block 404 "adds N to the register value if the register value is not larger than 0", then the operation is the same as that of the foregoing embodiments of the present invention. Further, the prescribed value T may be set to N+1 when m=M, and to −1 when m=−M. Furthermore, the register value adding block 404 may perform the register value addition and, at the same time, issue the processing instruction to the image processing block 406, or to issue the processing instruction to the image processing block 406 after performing the register value addition.

The first to third embodiments have been described by taking a video tape recorder as an example of the input source, but the embodiments are also applicable for any other media such as video disks or data accessible via the Internet or the like.

Likewise, the fourth to sixth embodiments have been described by taking a video tape recorder as an example of the input source, but the embodiments are also applicable, without losing their real time capabilities, for any other media such as video disks or data transmitted via broadcasting or via the Internet.

(Embodiment 7)

Figure 7:
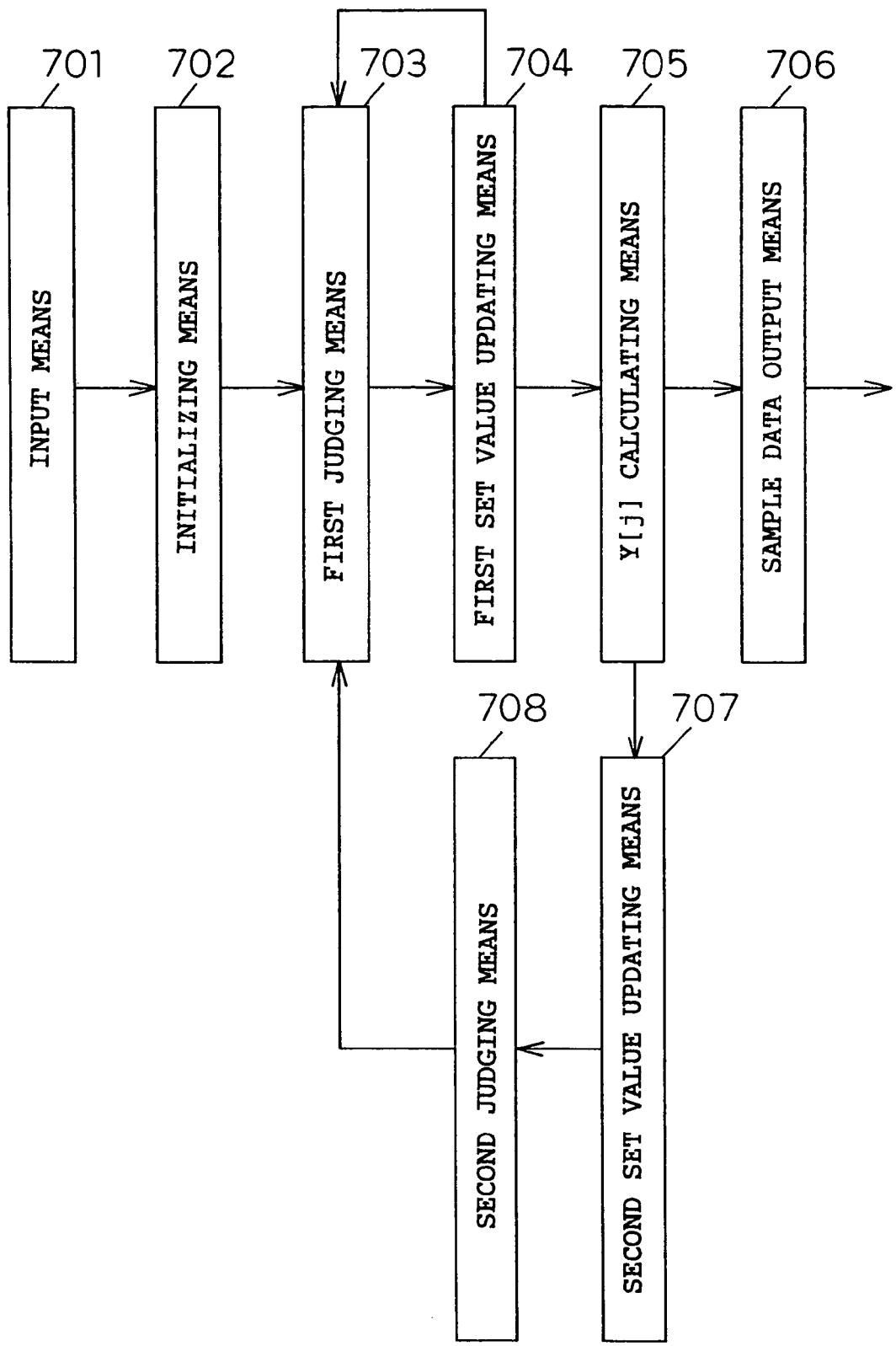
FIG. 7 is a block diagram showing seventh and eighth embodiments of the present invention.

FIG. 7 is a block diagram showing the configuration of a data processing apparatus according to a seventh embodiment of the present invention.

The data processing apparatus of this embodiment assumes the case in which when playing back moving image data with audio or the like on a personal computer, for example, sample data conversion for converting the frequency of image and audio of digital format becomes necessary because of the constraints of hardware constituting the personal computer and other software, but this embodiment utilizes fundamentally the same concept as that described in connection with the foregoing fourth to sixth embodiments.

Unlike the foregoing embodiment which adjusts the number of frames to be processed, the present embodiment shows a configuration example that is applicable when converting the number of pixel samples forming one frame.

As shown in FIG. 7, the seventh embodiment comprises an input means 701, an initializing means 702, a first judging means 703, a first set value updating means 704, a Y[j] calculating means 705, a sample data output means 706, a second set value updating means 707, and a second judging means 708.

Figure 8:
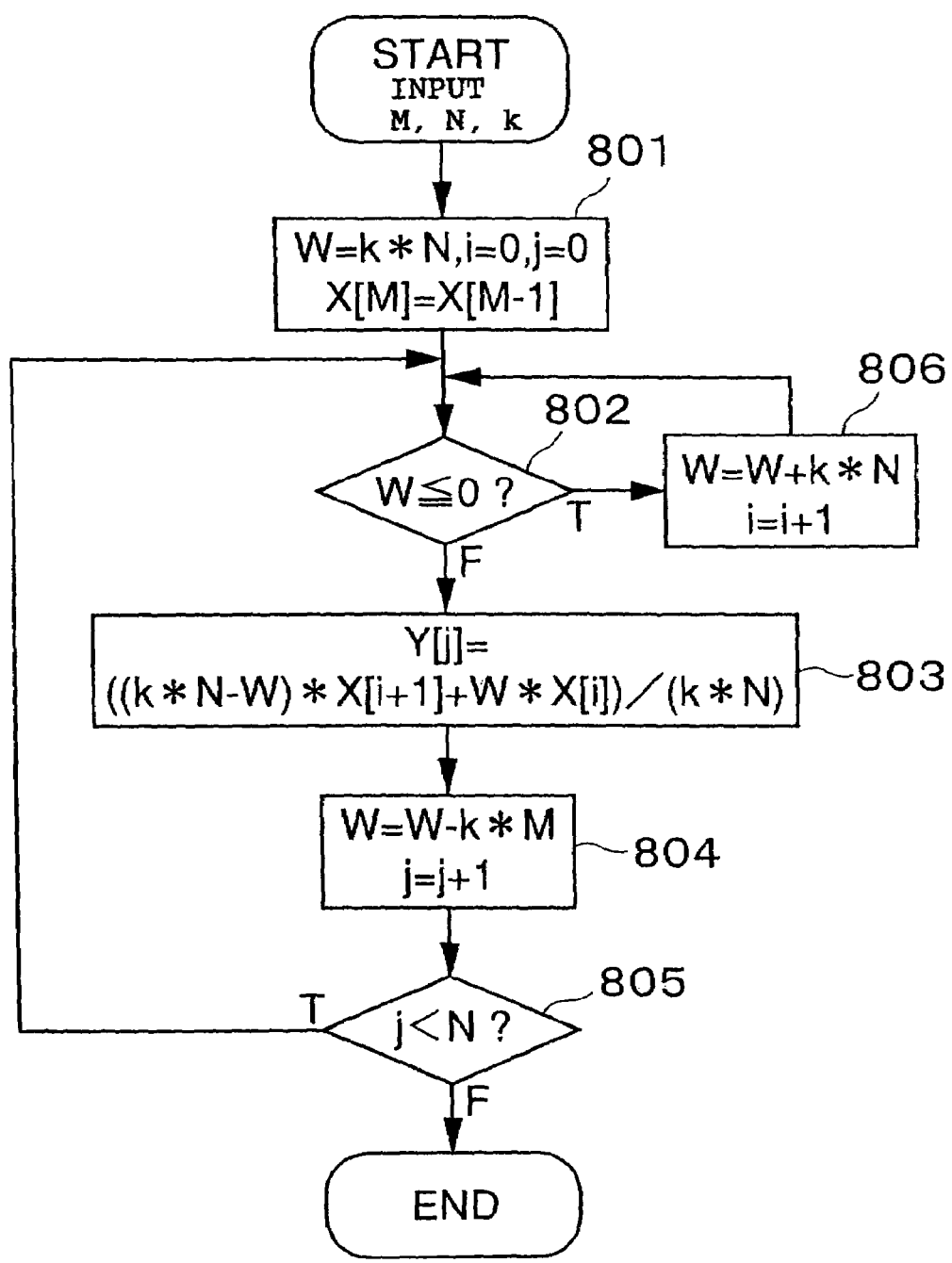
FIG. 8 is a flow chart illustrating the operation of the seventh and eighth embodiments of the present invention.

FIG. 8 is a flow chart illustrating the operation of the seventh embodiment.

In FIG. 8, reference numeral 801 is an initializing step, 802 is a first judging step, 803 is a sample data output step, 804 is a subtraction step, 805 is a second judging step, and 806 is an addition step.

Figure 9:
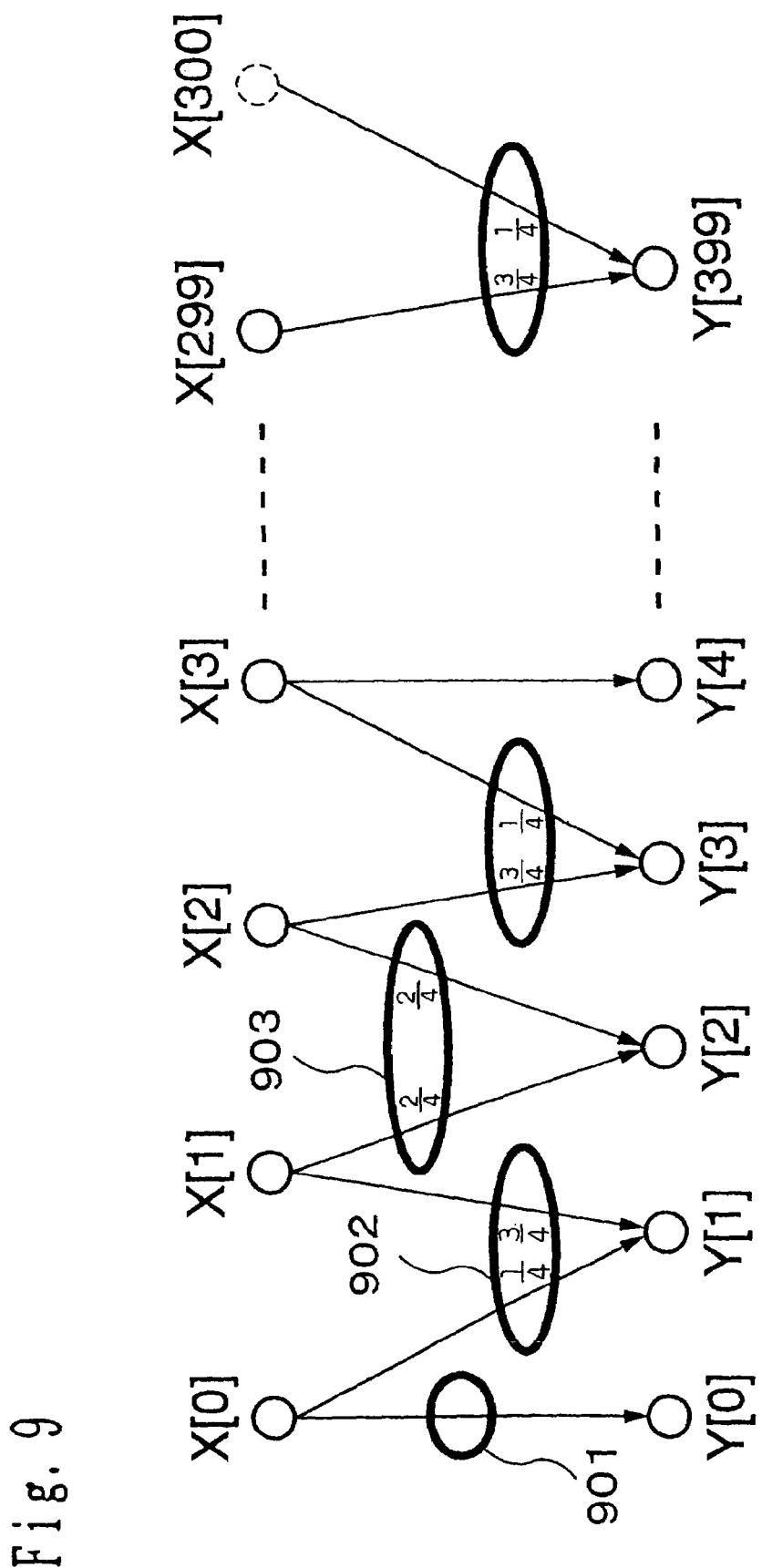
FIG. 9 is an explanatory diagram for explaining in detail the operation of the seventh embodiment of the present invention.

FIG. 9 is an explanatory diagram for explaining in detail the operation of the seventh embodiment.

In the seventh embodiment, it is assumed that the number of samples, M, in the input sample data sequence X[i] is 300 and the number of samples, N, in the output sample data sequence Y[j] is 400. Further, a predetermined constant k is considered; in the seventh embodiment, the constant k is 1.

Referring to FIGS. 7 to 9, the operation of the seventh embodiment will be described below along with a data processing method constituting one embodiment of the present invention.

Here, the value of the i-th ($0 \leq i \leq M-1$) sample in the input sample data sequence is denoted by X[i], and the value of the j-th ($0 \leq j \leq M-1$) sample in the output sample data sequence is represented by Y[j].

In this case, the input means 701 first inputs the values of M, N, and the constant k. In the present embodiment, the input means 701 inputs M=300, N=400, and k=1.

Next, in the initializing step 801, the initializing means 702 sets an initial value for a prescribed parameter W and initial values for i and j, and also sets X[M]=X[M−1] for convenience of calculating the final output sample data Y[N−1]. In the present embodiment, W=400 (=k×N), i=0, j=0, and X[300]=X[299] are set.

The process then proceeds to the first judging step 802. In the first judging step 802, the first judging means 703 first judges whether the value of k input by the input means 701 is positive or negative. In this embodiment, the value is judged to be positive since k is 1.

Next, the first judging means 703 judges whether the parameter W is 0 or less or not. If the result of the judgement in the first judging step 802 is false, the process proceeds to the sample data output step 803; if the result of the judgement in the first judging step 802 is true, the process proceeds to the addition step 806. Since the value of W at this time is 400, the result of the judgement in the first judging step 802 is false, so that the process proceeds to the sample data output step 803.

After the first judging means 703 has judged whether the parameter W is 0 or less or not, when the constant k is positive, the first set value updating means 704 does not change the value of i if the parameter W is larger than 0, but changes the value of i to (i+1) and the value of the parameter W to (W+k×N) if the parameter W is 0 or less. Since, at this time, the parameter W is 400, the value of i is not changed.

Next, in the sample data output step 803, the Y[j] calculating means 705 calculates the zeroth sample data Y[0] in the output sample data sequence Y[j] in accordance with equation 1.

$$Y[j]=((k \times N-W) \times X[i+1]+W \times X[i])/(k \times N) \quad \text{(Equation 1)}$$

More specifically, Y[0] is calculated using equation 2.

$$Y[0]=((400-400) \times X[1]+400 \times X[0])/400=X[0] \quad \text{(Equation 2)}$$

The sample data output means 706 then outputs Y[0] calculated by the Y[j] calculating means 705.

This Y[0] is the same as X[0], as shown by 901 in FIG. 3 [sic;9], meaning that X[0] is output unaltered as Y[0].

Next, in the subtraction step 804 which follows the calculation of Y[0] by the Y[j] calculating means 705, the second set value updating means 707 changes the value of the parameter W used for the calculation of Y[0] to (W−k×M) and also changes Y[0] to Y[1].

That is, in this case, in the subtraction step 804, W is changed to W=400−300=100 and j to j=0+1=1.

Next, in the second judging step 805, the second judging means 708 judges whether the value of j updated by the second set value updating means 707 is less than N, that is, less than 400 or not and, if the updated value of j is judged to be less than N, then allows the first judging means 703 to continue further processing; on the other hand, if the updated value of j is judged to be not smaller than N, the whole process is terminated. Since, at this point in time, the value of j updated by the second set value updating means 707 is 1, the second judging step 805 judges that j=1<400=N, and the process returns to the first judging step 802.

Next, in the first judging step 802, the first judging means 703 judges whether the parameter W updated by the second set value updating means 707 is 0 or less or not. Since the updated parameter W is 100, the result of the judgment is false, and the process proceeds to the sample data output step 803.

Next, in the sample data output step 803, the Y[j] calculating means 705 calculates the first sample data Y[1] in the output sample data sequence Y[j] in accordance with equation 1.

More specifically, Y[1] is calculated using equation 3.

$$Y[1]=((400-100)\times X[1]+100\times X[0])/400=\tfrac{3}{4}\times X[1]+\tfrac{1}{4}\times X[0] \quad \text{(Equation 3)}$$

Then the sample data output means 706 outputs Y[1] calculated by the Y[j] calculating means 705.

This Y[1] is the weighted average of X[1] and X[0] with weights given in the ratio of 3:1, as shown by 902 in FIG. 9.

Next, in the subtraction step 804 which follows the calculation of Y[1] by the Y[j] calculating means 705, the second set value updating means 707 changes the value of the parameter W used for the calculation of Y[1] to (W−k×M) and also changes Y[1] to Y[2].

That is, in this case, in the subtraction step 804, W is changed to W=100−300=−200 and j to j=1+1=2.

Next, in the second judging step 805, the second judging means 708 judges whether the value of j updated by the second set value updating means 707 is less than N or not, as earlier described; since, at this point in time, the value of j updated by the second set value updating means 707 is 2, the second judging step 805 judges that j=2<400=N, and the process returns to the first judging step 802.

Next, in the first judging step 802, the first judging means 703 judges whether the parameter W updated by the second set value updating means 707 is 0 or less or not. Since the updated parameter W is −200, the result of the judgment is true, and the process proceeds to the addition step 806.

Then, in the addition step 806, since the parameter W is −200, the first set value updating means 704 changes the value of the parameter W to (W+k×N).

That is, the value of the parameter W is changed to −200+400=200. In the addition step 806, the first set value updating means 704 further changes the value of i thus far used to (i+1). That is, the value of i is changed from 0 to 1. After that, the process returns once again to the first judging step 802.

Next, in the first judging step 802, the first judging means 703 judges whether the parameter W updated by the first set value updating means 704 is 0 or less or not. Since the updated parameter W is 200, the result of the judgement is false, and the process proceeds to the sample data output step 803.

Next, in the sample data output step 803, the Y[j] calculating means 705 calculates the second sample data Y[2] in the output sample data sequence Y[j] in accordance with equation 1.

More specifically, Y[2] is calculated using equation 4.

$$Y[2]=((400-200)\times X[1]+200\times X[0])/400=\tfrac{1}{2}\times X[2]+\tfrac{1}{2}\times X[1] \quad \text{(Equation 4)}$$

Then the sample data output means 706 outputs Y[2] calculated by the Y[j] calculating means 705.

This Y[2] is the weighted average of X[2] and X[1] with weights given in the ratio of 1:1, as shown by 903 in FIG. 9.

After that, the above process is repeated to output the output sample data Y[j] sequentially. The final output sample data Y[399] is calculated in accordance with equation 5.

$$Y[399]=((400-300)\times X[300]+300\times X[299])/400=\tfrac{1}{4}\times X[300]+\tfrac{3}{4}\times X[299] \quad \text{(Equation 5)}$$

However, since X[300] does not actually exist, equation 5 cannot be calculated. Here, it should be noted that X[300]=X[299] has been set by the initializing means 2 in the initializing step 801; accordingly, equation 5 is calculated by replacing X[300] with X[299], and the result is Y[399]=X[299].

After outputting Y[399], j=400 is set in the subtraction step 804. In this case, the result of the judgement in the second judging step 805 is false, so that the process is terminated.

As described above, in the seventh embodiment, the conversion of sample data counts that becomes necessary for resolution conversion of image signals or frequency conversion of audio signals or the like can be accomplished with a smaller memory capacity and fewer calculation steps than would be needed in the prior art. Further, the weighted averaging performed in the sample data output step 803 has the same effect as low-pass filtering.

In the present embodiment, k×N is set as the initial value of W in the initializing step 801; this is to make the first input and output data match in phase by setting Y[0]=X[0]. Any value can be used as the initial value of W as long as the value satisfies the relation $0 \leq W \leq k \times N$.

If k is negative, exactly the same thing can be accomplished by reversing the judgement condition in the first judging step 802.

(Embodiment 8)

Next, a data processing apparatus according to an eighth embodiment of the present invention will be described.

The configuration of this embodiment is the same as that of the foregoing seventh embodiment, and therefore the description thereof will not be repeated here.

Next, the operation of the eighth embodiment of the present invention will be described along with a data processing method constituting one embodiment of the present invention.

While the constant k was set to 1 in the seventh embodiment, in the present embodiment the value of k is set to 1/100. Further, the number of samples, M, in the input sample data sequence X[i] is set to 400 and the number of samples, N, in the output sample data sequence Y[j] to 300.

That is, the differences between the seventh and eighth embodiments are the number of samples, M, in the input sample data sequence X[i], the number of samples, N, in the output sample data sequence Y[j], and the value of the constant k.

More specifically, while the seventh embodiment concerned an example in which the number of samples was increased, the eighth embodiment concerns an example in which the number of samples is reduced, and k is set as the reciprocal of the least common multiple of M and N.

Figure 10:
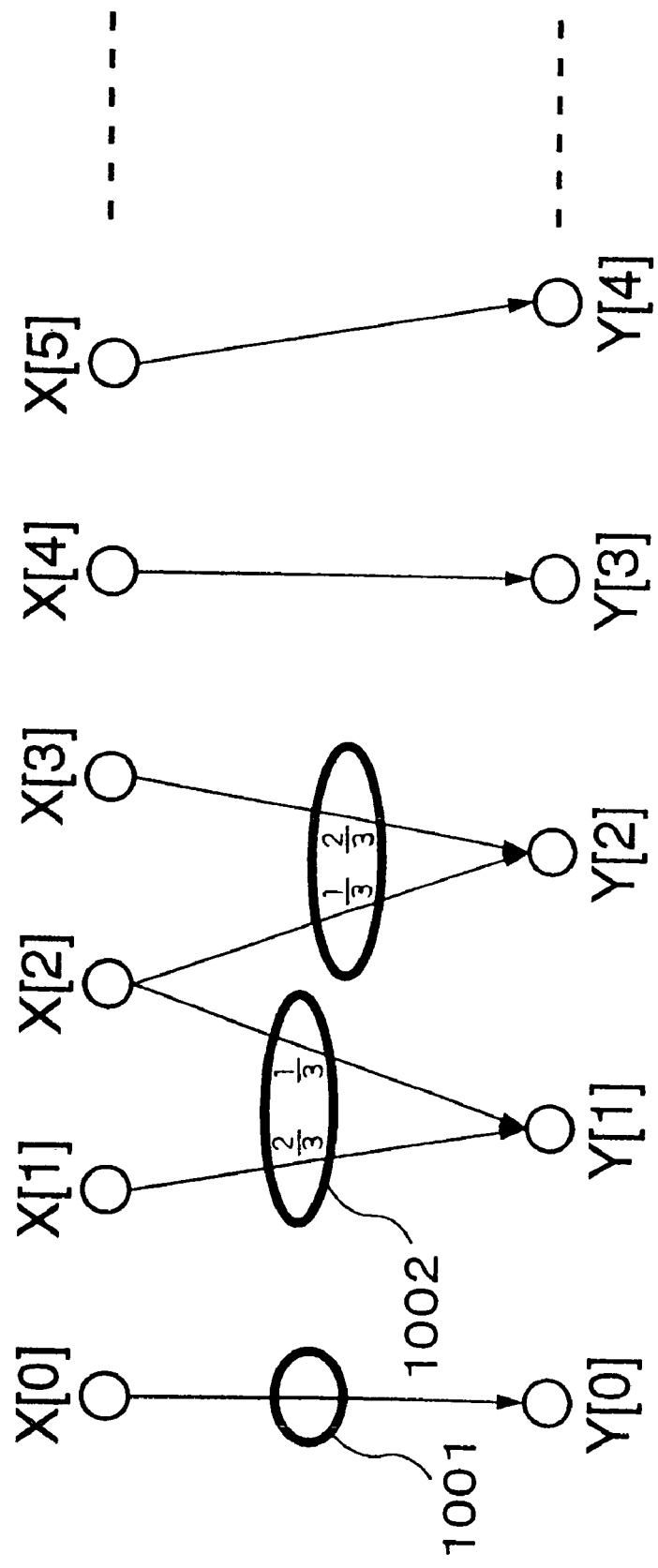
FIG. 10 is an explanatory diagram for explaining in detail the operation of the eighth embodiment of the present invention.

Referring to FIGS. 7, 8, and 10, the operation of the eighth embodiment will be described in detail below.

First, the input means 701 inputs the values of M, N, and the constant k. In the present embodiment, the input means 701 inputs M=400, N=300, and k=1/100.

Next, in the initializing step 801, the initializing means 702 sets an initial value for the prescribed parameter W and initial values for i and j, and also sets X[M]=X[M−1] for convenience of calculating the final output sample data Y[N−1]. In the present embodiment, W=3 (=k×N), i=0, j=0, and X[400]=X[399] are set.

The process then proceeds to the first judging step 802. In the first judging step 802, the first judging means 703 first judges whether the value of k input by the input means 701 is positive or negative. In the eighth embodiment, the value is judged to be positive since k is 1/100.

Next, the first judging means 703 judges whether the parameter W is 0 or less or not. If the result of the judgement in the first judging step 802 is false, the process proceeds to the sample data output step 803; if the result of the judgement in the first judging step 802 is true, the process proceeds to the addition step 806. Since the value of W at this time is 3, the result of the judgement in the first judging step 802 is false, so that the process proceeds to the sample data output step 803.

After the first judging means 703 has judged whether the parameter W is 0 or less or not, when the constant k is positive the first set value updating means 704 does not change the value of i if the parameter W is larger than 0, but changes the value of i to (i+1) and the value of the parameter W to (W+k×N) if the parameter W is 0 or less. Since, at this time, the parameter W is 3, the value of i is not changed.

Next, in the sample data output step 803, the Y[j] calculating means 705 calculates the zeroth sample data Y[0] in the output sample data sequence Y[j] in accordance with equation 1.

$$Y[j]=((k\times N-W)\times X[i+1]+W\times X[i])/(k\times N) \quad \text{(Equation 1)}$$

More specifically, Y[0] is calculated using equation 6.

$$Y[0]=((3-3)\times X[1]+3\times X[0])/3=X[0] \quad \text{(Equation 6)}$$

The sample data output means 706 then outputs Y[0] calculated by the Y[j] calculating means 705.

This Y[0] is the same as X[0], as shown by 1001 in FIG. 10, meaning that X[0] is output unaltered as Y[0].

Next, in the subtraction step 804 which follows the calculation of Y[0] by the Y[j] calculating means 705, the second set value updating means 707 changes the value of the parameter W used for the calculation of Y[0] to (W−k×M) and also changes Y[0] to Y[1].

That is, in this case, in the subtraction step 804, W is changed to W=3−4=−1 and j to j=0+1=1.

Next, in the second judging step 805, the second judging means 708 judges whether the value of j updated by the second set value updating means 707 is less than N, that is, less than 300 or not and, if the updated value of j is judged to be less than N, then allows the first judging means 703 to continue further processing; on the other hand, if the updated value of j is judged to be not smaller than N, the whole process is terminated. Since, at this point in time, the value of j updated by the second set value updating means 707 is 1, the second judging step 805 judges that j=1<300=N, and the process returns to the first judging step 802.

Next, in the first judging step 802, the first judging means 703 judges whether the parameter W updated by the second set value updating means 707 is 0 or less or not. Since the updated parameter W is −1, the result of the judgment is true, and the process proceeds to the addition step 806.

Then, in the addition step 806, since the parameter W is −1, the first set value updating means 704 changes the value of the parameter W to (W+k×N). That is, the value of the parameter W is changed to −1+3=2. In the addition step 806, the first set value updating means 704 further changes the value of i thus far used to (i+1).

That is, the value of i is changed from 0 to 1. After that, the process returns once again to the first judging step 802.

Next, in the first judging step 802, the first judging means 703 judges whether the parameter W updated by the first set value updating means 704 is 0 or less or not. Since the updated parameter W is 702, the result of the judgement is false, and the process proceeds to the sample data output step 803.

Next, in the sample data output step 803, the Y[j] calculating means 705 calculates the first sample data Y[1] in the output sample data sequence Y[j] in accordance with equation 1.

More specifically, Y[1] is calculated using equation 7.

$$Y[1]=((3-2)\times X[2]+2\times X[1])/3=\tfrac{1}{3}\times X[2]+\tfrac{2}{3}\times X[1] \quad \text{(Equation 7)}$$

Then the sample data output means 706 outputs Y[1] calculated by the Y[j] calculating means 705.

This Y[1] is the weighted average of X[2] and X[1] with weights given in the ratio of 1:2, as shown by 1002 in FIG. 10.

After that, by repeating the above process in the same manner as in the seventh embodiment until j=300 thereby making the result of the judgement in the second judging step 805 become false, 300 output sample data Y[0], Y[1], Y[2], . . . , Y[299] can be obtained.

With the sample data sequence conversion illustrated in the present embodiment, not only the conversion that involves increasing the number of sample data but also the conversion that involves reducing the number can be accomplished using the same algorithm.

Furthermore, in the present embodiment, by setting k=1/100, it becomes possible to reduce the necessary bit count of the parameter needed for the calculation of each Y[j] in the sample data output step 803. If k=1 as in the seventh embodiment, at least 9 bits are needed to hold W, k×N, and other values, and when describing in the C language, a short type or a long type variable becomes necessary. On the other hand, if k=1/100, only two bits are needed, and a char type variable is sufficient for the purpose.

Further, as in the seventh embodiment, any value that satisfies the relation 0≦W≦k×N can be chosen as the initial value of W, and if k is negative, exactly the same thing can be accomplished by reversing the judgement condition in the first judging step 802.

The seventh and eighth embodiments have each been described as calculating Y[j] using X[i] and X[i+1], but instead, each Y[j] may be calculated using three or more different X[i], for example, X[i], X[i+1], X[i+2], etc. Alternatively, each Y[j] may be calculated by multiplying, for example, the squares of X[i] and X[i+1] by a prescribed coefficient. In other words, each Y[j] maybe calculated using a linear function of a plurality of X[i] or a nonlinear function of a plurality of X[i].

(Embodiment 9)

Figure 11:
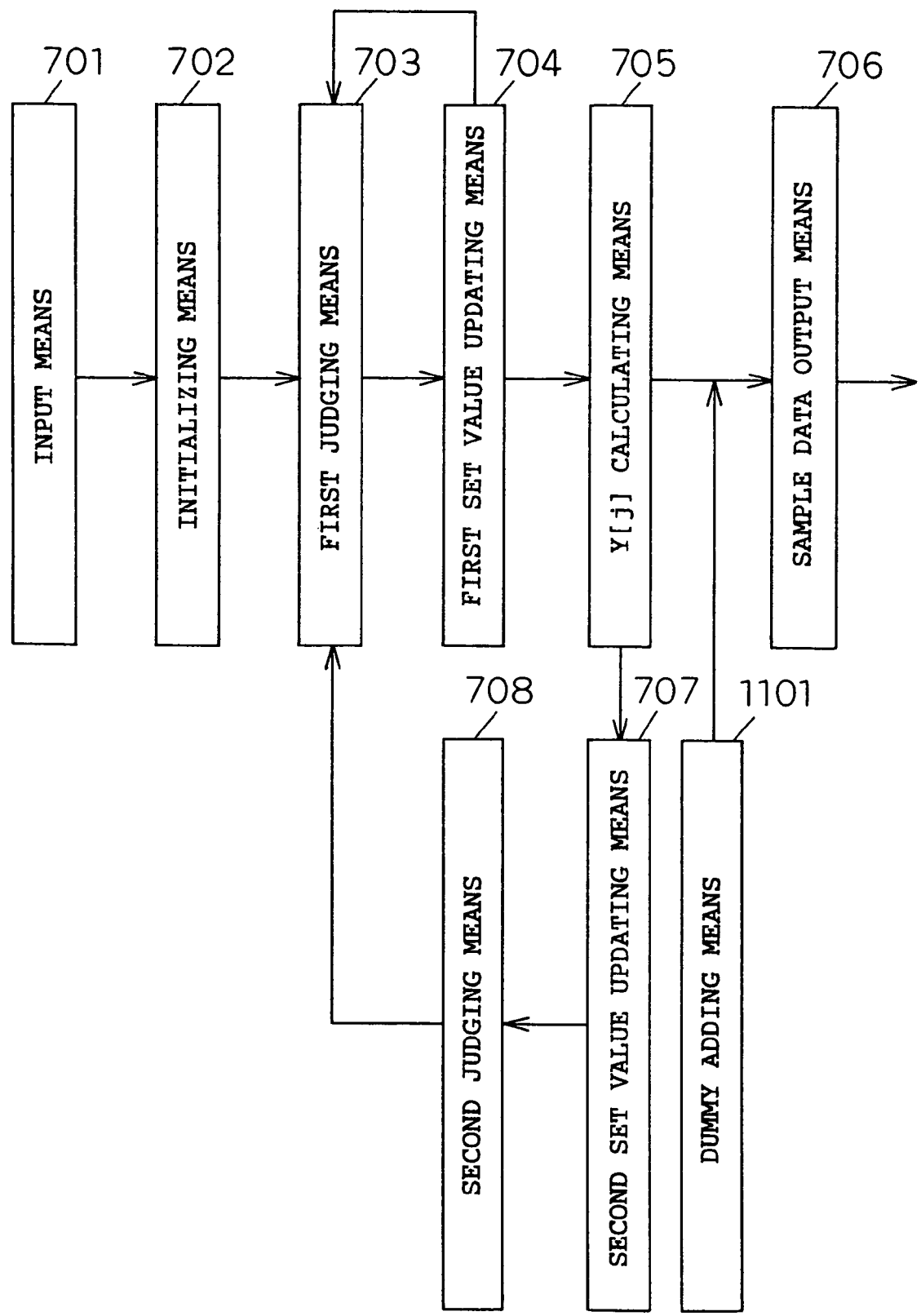
FIG. 11 is a block diagram showing a ninth embodiment of the present invention.

FIG. 11 is a block diagram showing the configuration of a data processing apparatus according to a ninth embodiment of the present invention.

As shown in FIG. 11, in the ninth embodiment of the present invention, a dummy adding means 1101 is added to the configuration of the seventh embodiment described with reference to FIG. 7.

Figure 12:
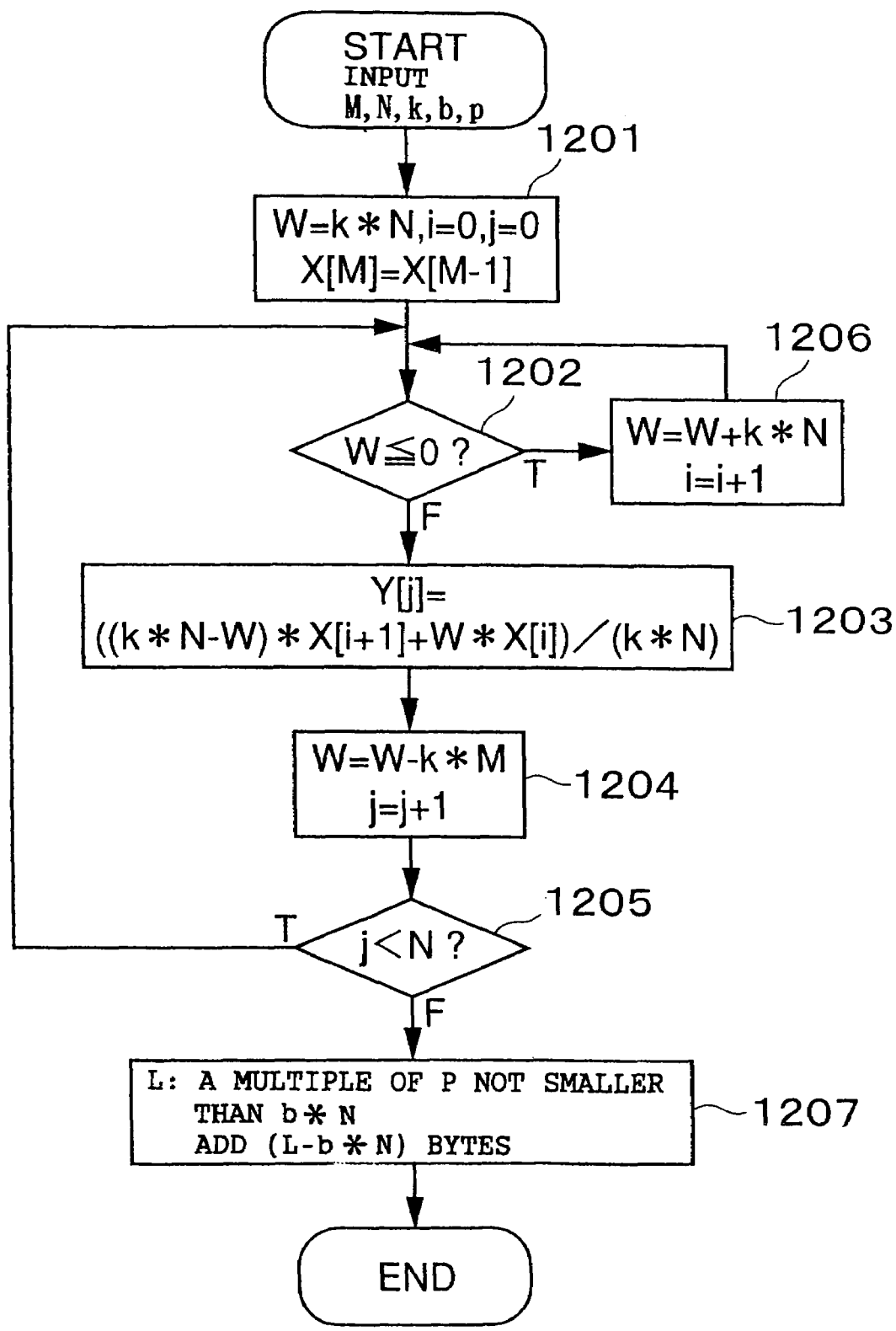
FIG. 12 is a flow chart illustrating the operation of the ninth embodiment of the present invention.

FIG. 12 shows a flow chart illustrating the operation of the ninth embodiment.

In FIG. 12, 1201 is an initializing step, 1202 is a first judging step, 1203 is a sample data output step, 1204 is a subtraction step, 1205 is a second judging step, 1206 is an addition step, and 1207 is a dummy adding step.

The initializing step 1201, the first judging step 1202, the sample data output step 1203, the subtraction step 1204, the second judging step 1205, and the addition step 1206 in FIG. 12 are substantially the same as the initializing step 801, the first judging step 802, the sample data output step 803, the subtraction step 804, the second judging step 805, and the addition step 806 in FIG. 8. Accordingly, FIG. 12 is the same as Figure which is substantially added the dummy adding step 1207 to each step in FIG. 8.

Referring to FIGS. 11 and 12, the operation of the ninth embodiment will be described in detail below, along with a data processing method constituting one embodiment of the present invention.

The present embodiment deals with the case in which an image data sequence X[i] comprising 400 pixels per line with three bytes per pixel is converted to an image data sequence Y[j] without changing the number of lines but by reducing the number of pixels per line to 375.

To simplify the explanation, the present embodiment assumes that both input and output consist of one line of pixel data.

It is also assumed that the output sample data sequence Y[j] is filled in a memory on a line by line basis without leaving gaps, and that the first data on each line must be aligned on a four byte boundary in order to correctly handle the data as a DIB (Device Independent Bitmaps) format.

The flow chart of FIG. 12 is applied by setting M=400, N=375, k=1, b=3, and p=4. Though the values of M and N are different from those in the seventh embodiment, in the ninth embodiment the operation is similar to that of the seventh embodiment. Here, b and p will be described later.

In the initializing step 1201, initial values are set for the necessary parameters. In the present embodiment, W is set to 375 (k×N), i to 0, j to 0, and X[400] to X[399].

Then, operation similar to that of the seventh and eighth embodiments is performed to sequentially output N=375 output sample data.

After the 375 output sample data have been output, when j=375 thereby making the result of the judgement in the second judging step 1205 become false, the process proceeds to the dummy adding step 1207.

An explanation will now be given of why the process proceeds to the dummy adding step 1207 when j=375 thereby making the result of the judgement in the second judging step 1205 become false.

When handling image data of the DIB format on the Windows, images cannot be output correctly unless the first data on each line is aligned on a four byte boundary. That the data is aligned on a p byte boundary means that the absolute address value of the data is a multiple of p.

For example, in a 24-bit RGB representation (a total of 24 bits per pixel, 8 bits each for red, green, and blue) which is a typical scheme in the DIB format, each pixel occupies an area of three bytes.

Accordingly, when an input data sequence is converted for each horizontal row to an output data sequence whose number of samples is not a multiple of 4, there is no guarantee that the first data on each line will be aligned on a four byte boundary, and the image may not be displayed correctly.

Therefore, the process proceeds to the dummy adding step 1207 so that the image will be displayed correctly even when the input data sequence is converted to an output data sequence whose number of samples is not a multiple of 4.

In the ninth embodiment, b=3 and p=4 are input at START in FIG. 12; here, b indicates the byte length of each sample in the output data sequence, and p means the byte boundary on which the first data in each output data sequence must be aligned.

Accordingly, the ninth embodiment will be described in detail by dealing with the case of b=3 and p=4.

In the present embodiment, since b=3 and N=375, b×N=1125 which is not a multiple of 4. This means that the first data in the output sample data sequence following the output sample data sequence of 375 samples would not be aligned on a four byte boundary. Here, in the dummy adding step 1207, the dummy adding means 1101 obtains L=1128 as a multiple of p=4 not smaller than 1125 and adds dummy data of L−b×N=3 bytes at the end of Y[374].

With the above operation, the 375 output sample data Y[0], Y[1], Y[2], . . . , Y[374] and the three dummy bytes can be output.

By repeating the above operation as many times as there are lines, an output pixel data sequence with the first data on each line aligned on a four byte boundary can be output. The image can thus be displayed correctly.

As described above, according to the present embodiment, data can be aligned on a desired byte boundary on an output-by-output basis. It thus becomes possible to enlarge or reduce image data of the DIB format to any desired size.

Further, as in the seventh and eighth embodiments, any value that satisfies the relation $0 \leq W \leq k \times N$ can be chosen as the initial value of W, and if k is negative, exactly the same thing can be accomplished by reversing the judgement condition in the first judging step 1202.

In the seventh to ninth embodiments, many variant forms of the embodiments can be generated by exchanging the addition in the addition step with the subtraction in the subtraction step and by changing the judgement condition in the first judging step.

This means that in FIG. 8, for example, the first equation in the addition step 806 may be changed to W=W−k×N and the first equation in the subtraction step 804 may be changed to W=W+k×N. If these changes are made, however, the judgement condition in the first judging step 802 must be changed to $W \geq 0$?.

(Embodiment 10)

Figure 13:
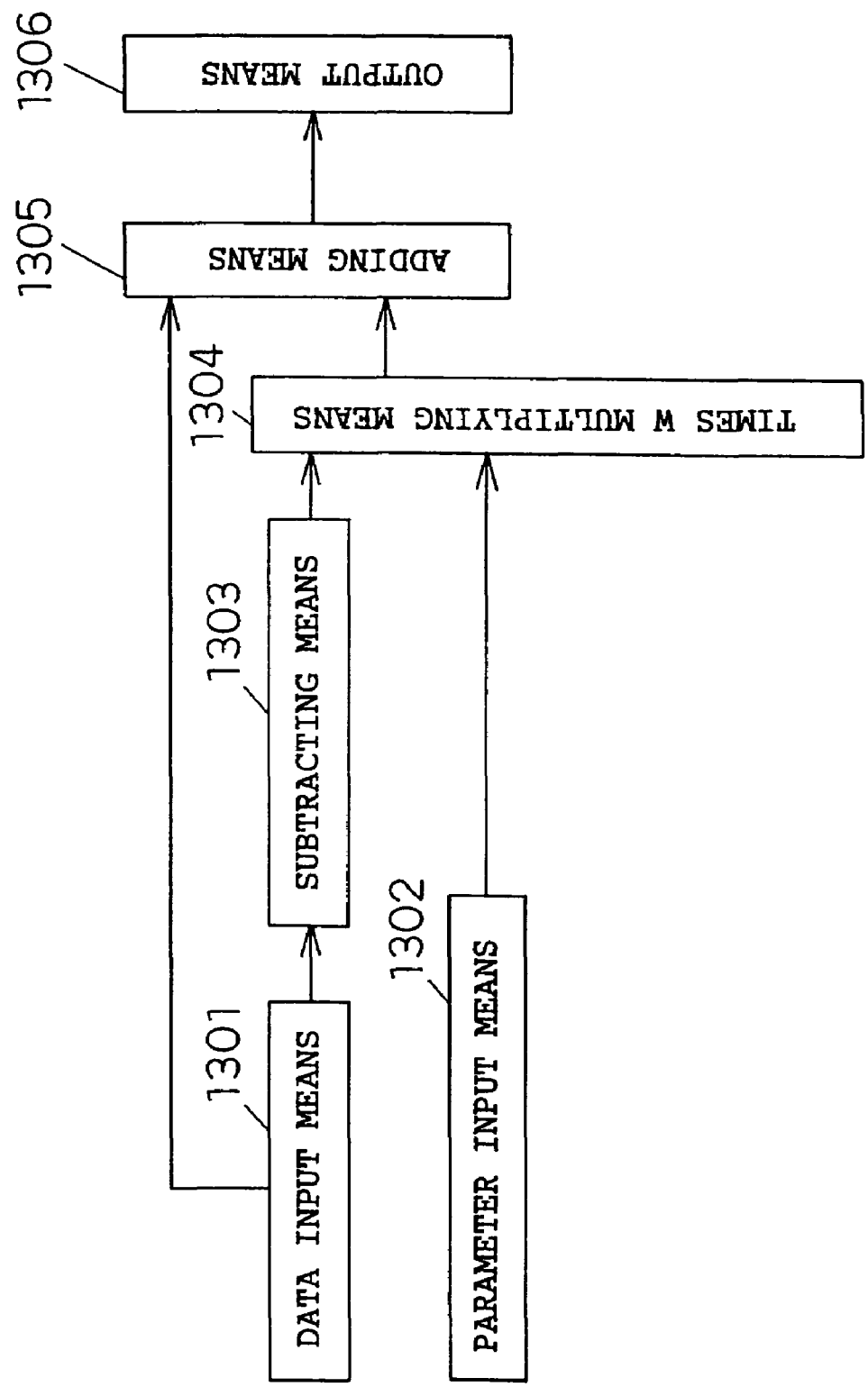
FIG. 13 is a block diagram showing a 10th embodiment of the present invention.

FIG. 13 is a block diagram showing the configuration of a data processing apparatus according to a 10th embodiment of the present invention.

As shown in FIG. 13, the 10th embodiment of the present invention comprises a data input means 1301, a parameter input means 1302, a subtracting means 1303, a times W multiplying means 1304, an adding means 1305, and an output means 1306.

Figure 14:
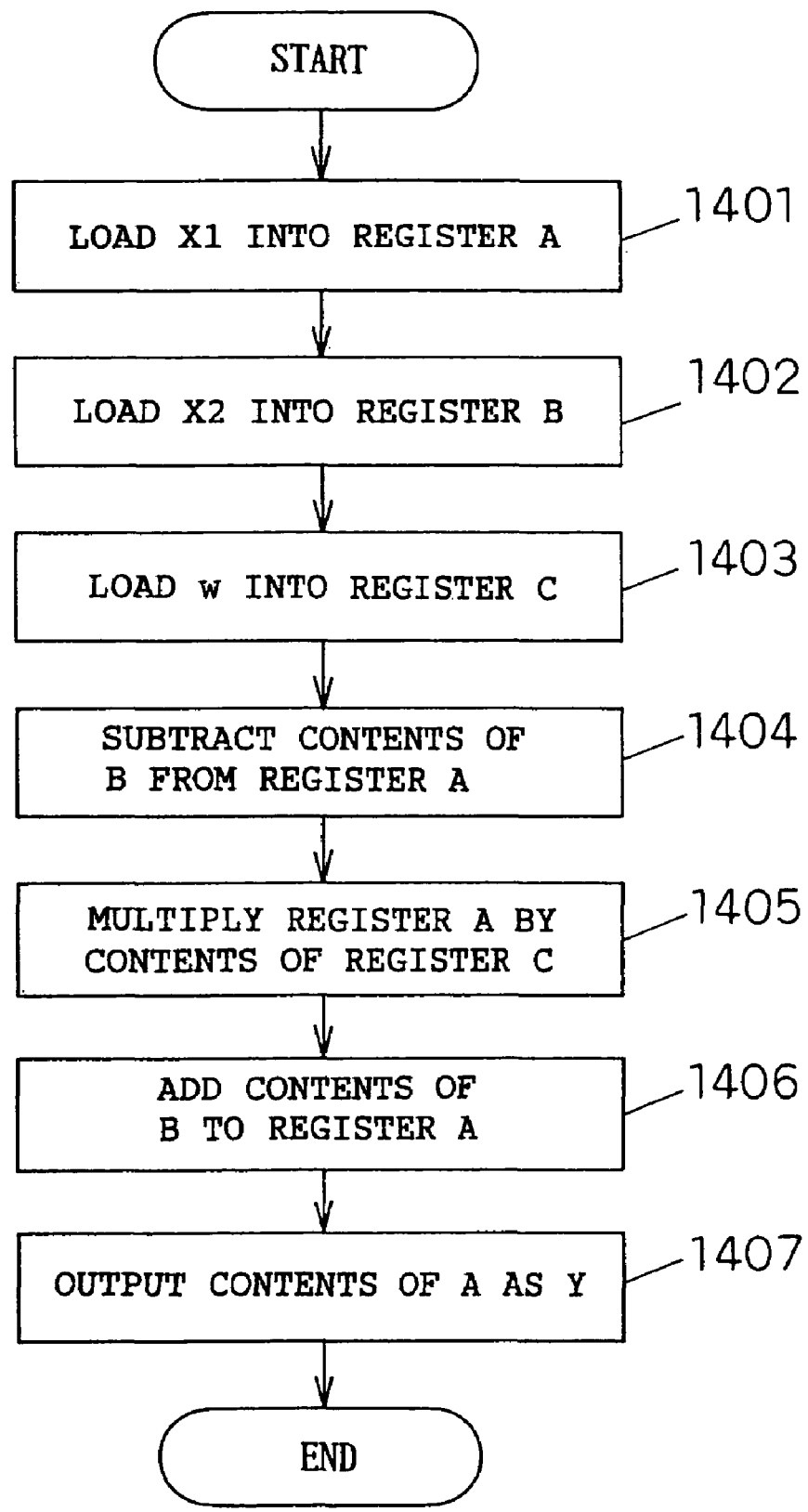
FIG. 14 is a flow chart illustrating the operation of the 10th embodiment of the present invention.

FIG. 14 shows a flow chart illustrating the operation of this embodiment. In FIG. 14, 1401 is a first load step, 1402 is a second load step, 1403 is a third load step, 1404 is a subtraction step, 1405 is a times W multiplying step, 1406 is an addition step, and 1407 is an output step.

The 10th embodiment of the present invention is used, for example, when generating a new number from two predetermined numbers, for example, in the sample data output step 803 in FIG. 8 of the seventh embodiment. Rearranging equation 1 in the sample data output step 803 in FIG. 8 yields equation 8 as shown below.

$$Y[j]=(1-w) \times X[i+1]+w \times X[i], \ w=W/(k \times N) \quad \text{(Equation 8)}$$

Referring to FIGS. 13 and 14, the operation of the 10th embodiment will be described below along with a data processing method constituting one embodiment of the present invention.

First, the data input means 1301 inputs data of two predetermined numbers X1 and X2.

Then, the parameter input means 1302 inputs a parameter w for obtaining a number Y located at a position at which the distance between X1 and X2 is divided in a ratio of (1−w):w.

The numbers X1 and X2 and the parameter w are loaded into a register A, a register B, and a register C in the first load step 1401, the second load step 1402, and the third load step 1403, respectively.

Next, in the subtraction step 1404, the subtracting means 1303 subtracts the contents of the register B from the contents of the register A. After the subtraction, X1−X2 is held in the register A.

Next, in the times W multiplying step 1405, the times W multiplying means 1304 multiplies the contents of the register A by the contents of the register C. As a result, w×(X1−X2) is held in the register A.

Next, in the addition step 1406, the adding means 1305 adds the contents of the register B to the contents of the register A. After the addition, w×(X1−X2)+X2 is held in the register A.

Finally, in the output step 1407, the output means 1306 outputs the result Y obtained by the adding means 1305. The result is expressed by equation 9.

$$Y=w\times(X1-X2)+X2=w\times X1+(1-w)\times X2 \quad \text{(Equation 9)}$$

Figure 18:
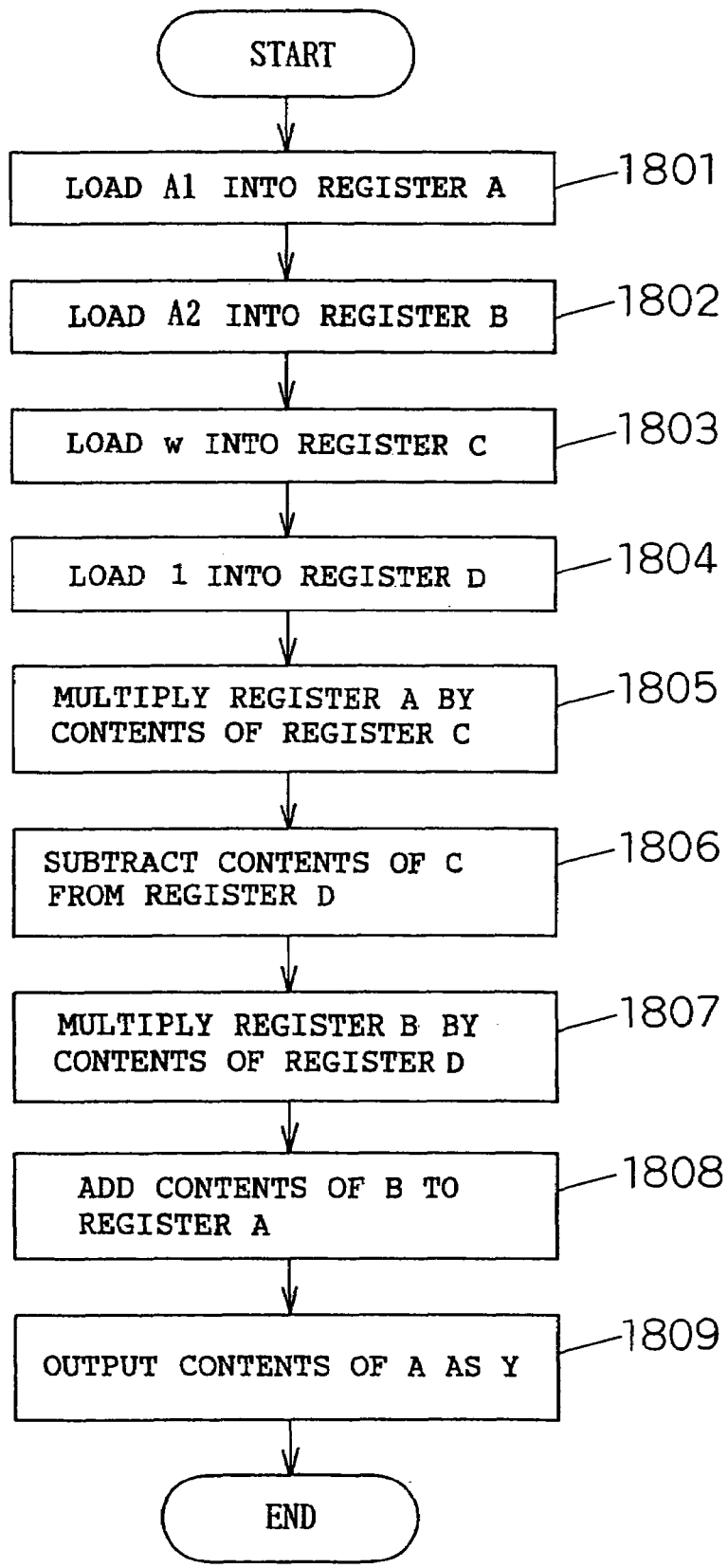
FIG. 18 is a flow chart illustrating a method of calculation by weighted averaging two adjacent numbers according to the prior art.

In the present embodiment, the operations necessary for obtaining one number Y are three load operations, two add/subtract operations, and a multiplication. Compared with the prior art example shown in FIG. 18, the number of load operations is reduced by one and the number of multiplications is also reduced by one. Furthermore, since computers usually require more clocks for multiplication operations than for subtract/add operations and load, reducing the number of multiplications by one for each output of Y (output value) offers the great effect of reducing the overall processing time.

As described above, according to the embodiment of the present invention, when weighted average calculations that occur frequently in filtering operations are performed by a computer, the number of multiplications can be reduced by one for each output sample, thus serving to greatly reduce the overall processing time.

Further, in the times W multiplying step of the present embodiment, if w is the reciprocal of a power of two, the multiplication operation can be replaced by a shift operation; this further increases the speed of operation.

Accordingly, when the configuration example of this embodiment is applied to the calculation processing described in connection with the foregoing embodiments, a further faster operating speed can be achieved.

(Embodiment 11)

Figure 15:
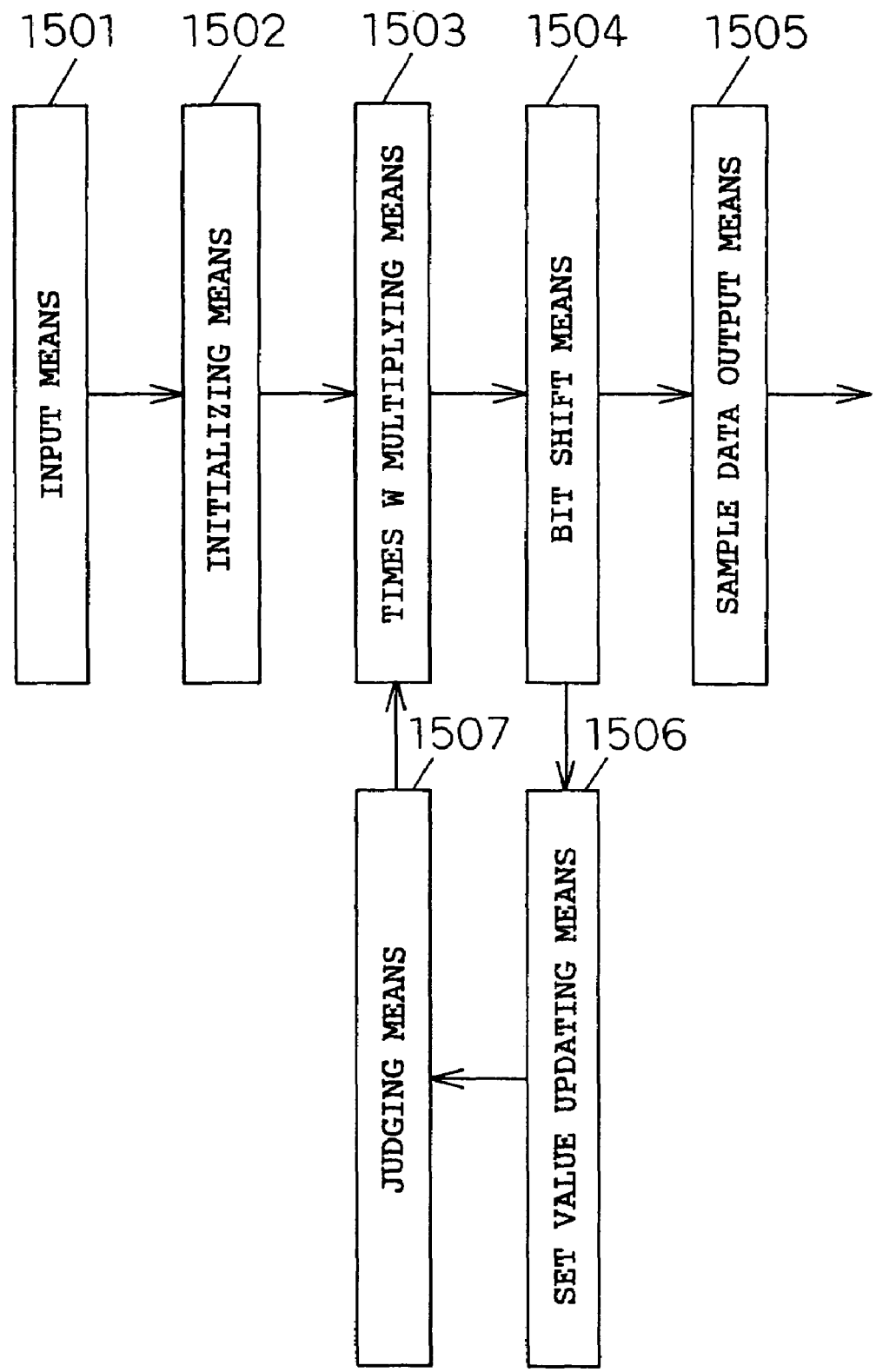
FIG. 15 is a block diagram showing an 11th embodiment of the present invention.

FIG. 15 is a block diagram showing the configuration of a data processing apparatus according to an 11th embodiment of the present invention.

As shown in FIG. 15, the 11th embodiment of the present invention comprises an input means 1501, an initializing means 1502, a times W multiplying means 1503, a bit shift means 1504, a sample data output means 1505, a set value updating means 1506, and a judging means 1507.

Figure 16:
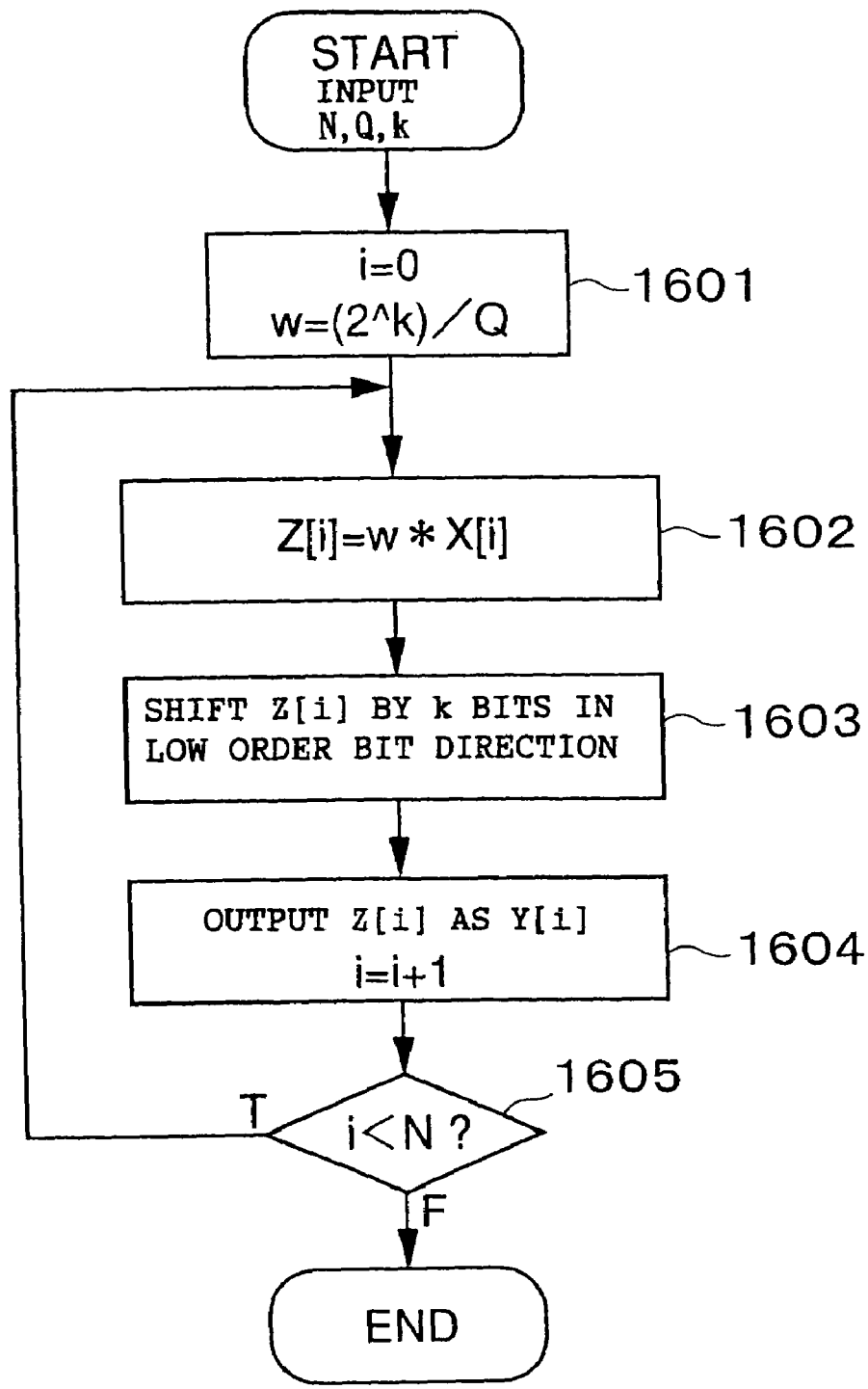
FIG. 16 is a flow chart illustrating the operation of the 11th embodiment of the present invention.
Figure 17:
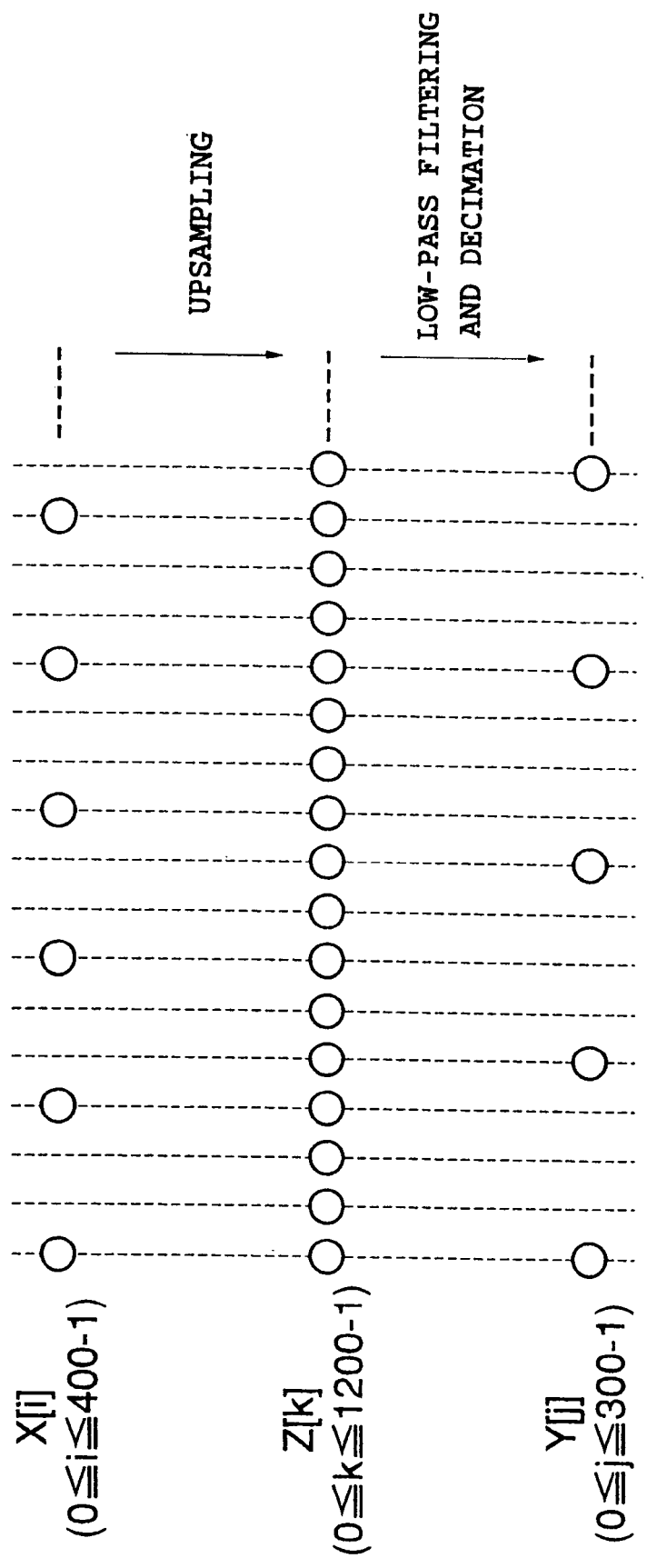
FIG. 17 is a diagram illustrating one example of a sample data conversion according to the prior art.

FIG. 16 is a flow chart illustrating the operation of the 11th embodiment.

In FIG. 16, 1601 is an initializing step, 1602 is a times w multiplying step, 1603 is a bit shift step, 1604 is a sample data output step, and 1605 is a judging step.

The 11th embodiment of the present invention is used, for example, when performing many divisions using the same constant, for example, in the sample data output step 803 in FIG. 8 of the seventh embodiment. Rearranging equation 1 in the sample data output step 803 in FIG. 8 yields equation 10 as shown below.

$$Y=X/(k\times N), X=(k\times N-W)\times X[i+1]+W\times X[i] \quad \text{(Equation 10)}$$

Performing many divisions such as shown in equation 10 imposes a great burden on the PC. In the 11th embodiment of the present invention, a method that can reduce the overall amount of computation involving many divisions will be described with reference to FIGS. 15 and 16. In the present embodiment, the number of input sample sequences X[i] is denoted by N. Further, samples in an output sample sequence Y[i], after the division, that correspond to the respective samples X[i] in the input sample sequence X[i] are each denoted by Y[i].

First, the input means 1501 inputs the value representing N as the number of input sample sequences X[i], a prescribed value of Q, and a prescribed natural number k.

Next, in the initializing step 1601, the initializing means 1502 sets 0 as the initial value of i, and a prescribed coefficient w that satisfies equation 11, and the process proceeds to the times w multiplying step 1602.

$$w=(2^k)/Q \quad \text{(Equation 11)}$$

where ^k means raising to the power k.

Next, in the times w multiplying step 1602, the times w multiplying means 1503 calculates w×X[0] using the input sample data X[0] and the W set in the initializing step 1601, and sets the result as Z[0].

Then, in the bit shift step 1603, the bit shift means 1504 shifts Z[0] by k bits in the low order direction by regarding Z[0] as a binary number. The k here means the k input by the input means 1501.

Next, in the sample data output step 1604, the sample data output means 1505 outputs the Z[0] shifted in the bit shift step 1603 as Y[0], and in the same sample data output step 1604, the set value updating means 1506 adds 1 to i and thus sets i to 1, after which the process proceeds to the judging step 1605.

In the judging step 1605, since i=1, the judging means 1507 judges the result to be true, and the process returns to the times w multiplying step 1602.

The above process is repeated until i=N, and when the result is judged to be false in the judging step 1605, the operation of the present embodiment is terminated.

In the prior art example, the number of necessary divisions was N. By contrast, in the present embodiment, the division is performed only once in the initializing step 1601, irrespective of the value of N. Generally, when performing a division in a computer, a much larger number of clocks are required than when performing a multiplication, not to speak of when performing add/subtract or shift operations. According to the present embodiment, therefore, by drastically reducing the number of divisions compared with the prior art example, the processing time can be reduced significantly.

Here, the value of k can be set arbitrarily according to the output resolution or the bit count of the register used; for example, when using a 32-bit register, it is preferable to set k=16.

As described above, according to the seventh and eighth embodiments of the present invention, the conversion from input sample data having an arbitrary number of samples, M, to an arbitrary number of output samples, N, can be performed at high speed.

Furthermore, by adding dummy data at the end of the output sample data, as described in the ninth embodiment, the first data on each line of an image can always be aligned on a four byte boundary, facilitating image size conversion to any desired size.

Moreover, by using the method of obtaining a weighted average as described in the 10th embodiment and the method of dividing the input data sequence by a common divisor as described in the 11th embodiment, the sample data conversion in the seventh to ninth embodiments can be performed at faster speed.

In the seventh to 11th embodiments, when $N/M \leq 1/2$, there occurs input sample data that is not referenced when generating output sample data. In that case, distortion due to aliasing may occur in those embodiments. A possible method for solving this deficiency is to change the initial value of the parameter W in the initializing step or to calculate Y[j] in the sample data output step from not only X[i+1] and X[i] but also many more input sample data.

Further, in the first to 11th embodiments, the same effects as described in connection with the respective embodiments can also be obtained by creating a program recording medium, such as a magnetic disk or an optical disk, that holds recorded thereon a program for having a computer implement all or part of the functions of the data processing method and all or part of the constituent elements of the data processing apparatus, and by operating the computer using the same.

It is also possible to transfer the software describing the present invention to another computer via a recording medium or a transmission medium, and to implement the calculation method of the present invention on that computer.

In the present invention, various other configurations than those described in the embodiments are possible and can be implemented in either hardware or software. Furthermore, the various inventions described above can be used in combination.

INDUSTRIAL APPLICABILITY

According to the present invention, if image processing cannot catch up with the input, the image data is re-input for processing by utilizing information concerning the recorded position, the recorded time, or the time at which playback is to be performed; this achieves the same effect as processing continuous moving image data without interruption.

Furthermore, by just using registers and performing addition and subtraction operations on the contents of the registers on a frame by frame basis, the processing can be decimated into a desired number of frames and also, the number of frames to be actually processed can be adjusted dynamically according to the image processing load.

Moreover, according to the present invention, input data having an arbitrary number of samples can be converted to data having an arbitrary number of samples for output. Furthermore, a large capacity memory for holding upsampled data and the computation necessary for both upsampling and decimation as shown by the prior art can be accomplished with a much smaller amount of computation.

What is claimed is:

1. A data processing method for converting an input sample data sequence representing image or audio data, consisting of M samples to an output sample data sequence consisting of N samples, comprising:

setting values of registers representing a nonzero constant k and a prescribed parameter W;

changing the value of parameter W in its register by repeatedly adding k*N to said parameter W by sequentially scanning input sample data as long as W≦0 when k>0 or as long as W≧0 when k<0;

outputting said converted output sample data when W becomes larger than 0 in the case of k>0 or W becomes smaller than 0 in the case of k>0 as a result of said repeated adding; and subtracting a value stored in a register representing k*M from a value stored in a register representing said W, wherein said repeatedly adding, outputting and subtracting are repeated until said N output sample data have been output, thereby converting an input sample data sequence representing image or audio data consisting of M samples to an output sample data sequence consisting of N samples.

2. A data processing method according to claim 1, further comprising a dummy adding step for adding dummy data of L−b*N bytes at an end of said output sample data sequence of N samples, where L is a multiple of p not smaller than b*N when each sample data in said output sample data sequence has a byte length represented by a prescribed constant b, and an overall byte length of said output sample data sequence is not an integral multiple of a prescribed constant p, and wherein said output sample data sequence of N samples is output together with said dummy data.

3. A data processing method according to claim 1, wherein said k is 1.

4. A data processing method according to claim 1, wherein said k is the reciprocal of the greatest common measure of said M and said N.

5. A data processing method for processing image data or audio data, comprising:

inputting to registers data of two predetermined numbers X1 and X2;

inputting to a register a value representing a parameter w for obtaining a number Y located at a position of a data matrix at which the distance between said X1 and said X2 is divided in a ratio of (1−w): w;

generating and storing in a register a value X3 by subtracting said the value X2 from the value X1;

generating and storing in a register a value X4 by multiplying the value of X3 obtained by subtracting by said parameter w;

generating generating and storing in a register a value Y by adding the value of X2 to the value of X4 obtained by multiplying; and reading and outputting from a register said value of Y obtained as a result of addition thereby converting an input sample data sequence representing image or audio data consisting of a first number of samples to an output sample data sequence consisting of a second number of samples.

6. A data processing method for inputting data sequence X[i] representing image or audio data including N data, and for outputting as Y[i] a value obtained by dividing said X[i] by a constant Q, comprising:

an initializing step for obtaining a coefficient w=2^k/Q (where ^k means raising to the power k) for an integer k larger than 0;

a times w multiplying step for obtaining w*X[i] using said X[i] and said coefficient w obtained in said initializing step, and for taking said obtained w*X[i] as a new X[i]; and a bit shift step for taking as Y[i] a value obtained by shifting the X[i] obtained in said times w multiplying step by k bits in a low order bit direction when said X[i] is expressed in bit representation, wherein said times w multiplying step and said bit shift step are repeated N times to sequentially output data sequence Y[i] including N data thereby, converting an input sample data sequence representing image or audio data consisting of a first number of samples to and output sample data sequence consisting of a second number of samples.

7. A data processing apparatus for converting an input sample data sequence representing image or audio data consisting of M samples to an output sample data sequence consisting of N samples, comprising:

initial value setting means for setting and storing in registers values representing a nonzero constant k and a prescribed parameter W;

means for changing the value of parameter W in its register by repeatedly adding k*N to said parameter W by sequentially scanning input sample data as long as W≦0 when k>0 or as long as W≧0 when k<0;

sample data output means for outputting said converted output sample data when W becomes larger than 0 in the case of k>0 or W becomes smaller than 0 in the case of k<0 by said sequential adding means; and subtracting means for subtracting k*M from said W, wherein means for causing said sequential adding means, said sample data output means, and said subtracting means to be operated in sequence repeatedly until said N output sample data have been output, thereby converting an input sample data sequence representing image or audio data consisting of M samples to an output sample data sequence consisting of N samples.

8. A data processing apparatus according to claim 7, further comprising dummy adding means for adding dummy data of L−b*N bytes at end of said output sample data sequence of N samples, where L is a multiple of p not smaller than b*N, when each sample data in said output sample data sequence has a byte length represented by a prescribed constant b, and an overall byte length of said output sample data sequence is not an integral multiple of a prescribed constant p, and wherein said output sample data sequence of N samples is output together with said dummy data.

9. A data processing apparatus according to claim 7, wherein said k is 1.

10. A data processing apparatus according to claim 7, wherein said k is the reciprocal of the greatest common measure of said M and said N.

11. A data processing apparatus for processing image data or audio data, comprising:

data input means for inputting data of two predetermined numbers X1 and X2;

parameter input means for inputting a parameter w for obtaining a number Y located at a position at which the distance between said X1 and said X2 is divided in a ratio of (1−w): w;

subtracting means for generating X3 by subtracting said X2 from said X1;

times w multiplying means for generating X4 by multiplying the X3 obtained by said subtracting means by said parameter w;

adding means for generating Y by adding said X2 to the X4 obtained by said times w multiplying means; and output means for outputting said Y obtained by said adding means, thereby converting an input sample data sequence representing image or audio data consisting of a first number of samples to an output sample data sequence consisting of a second number of samples.

12. A data processing apparatus for inputting data sequence X[i] including N data, and for outputting as Y[i] a value obtained by dividing said X[i] by a constant Q, the data being image data or audio data, comprising:

initializing means for obtaining a coefficient w=2^k/Q (where ^k means raising to the power k) for an integer k larger than 0;

times w multiplying means for obtaining w*X[i] using said X[i] and said coefficient w obtained by said initializing means, and for taking said obtained w*X[i] as a new X[i]; and bit shift means for taking as Y[i] a value obtained by shifting the X[i] obtained by said times w multiplying means by k bits in a low order bit direction when said X[i] is expressed in bit representation, wherein said times w multiplying means and said bit shift means are operated in sequence N times to sequentially output data sequence Y[i] including N data, thereby converting an input sample data sequence representing image or audio data consisting of a first number of samples to an output sample data sequence consisting of a second number of samples.

* * * * *